US006942930B2

(12) United States Patent
Arai et al.

(10) Patent No.: US 6,942,930 B2
(45) Date of Patent: Sep. 13, 2005

(54) COOLING ROLL, RIBBON-SHAPED MAGNETIC MATERIALS, MAGNETIC POWDERS AND BONDED MAGNETS

(75) Inventors: Akira Arai, Suwa (JP); Hiroshi Kato, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/383,305

(22) Filed: Mar. 7, 2003

(65) Prior Publication Data

US 2003/0217788 A1 Nov. 27, 2003

Related U.S. Application Data

(62) Division of application No. 09/833,806, filed on Apr. 12, 2001.

(30) Foreign Application Priority Data

Apr. 12, 2000 (JP) ....................................... 2000-110584
Dec. 28, 2000 (JP) ....................................... 2000-399876

(51) Int. Cl.[7] .............................. B23P 9/00; B22F 5/00
(52) U.S. Cl. ....................... 428/687; 428/608; 428/600; 148/302; 75/255; 252/62.54; 252/62.55
(58) Field of Search ................................ 428/600, 608, 428/687, 606; 148/302; 75/255; 252/62.54, 62.55

(56) References Cited

U.S. PATENT DOCUMENTS

| | | | |
|---|---|---|---|
| 3,939,900 A | 2/1976 | Polk et al. | |
| 4,077,462 A | 3/1978 | Bedell et al. | |
| 4,705,095 A | 11/1987 | Gaspar | |
| 4,865,117 A | 9/1989 | Bartlett et al. | |
| 4,903,751 A | 2/1990 | Hackman | |
| 4,930,565 A | 6/1990 | Hackman et al. | |
| 4,934,443 A | 6/1990 | Honeycutt et al. | |
| 4,945,974 A | 8/1990 | Honeycutt, III | |
| RE33,327 E | 9/1990 | Hackman et al. | |
| 5,010,947 A | 4/1991 | Yukumoto et al. | |
| 5,665,177 A | 9/1997 | Fukuno et al. | |
| 5,993,939 A | 11/1999 | Fukuno et al. | |
| 6,648,989 B2 * | 11/2003 | Arai et al. | 148/302 |

FOREIGN PATENT DOCUMENTS

| | | |
|---|---|---|
| EP | 0 529 148 | 10/1991 |
| JP | 1-245946 | 10/1989 |
| JP | 2-224853 | 9/1990 |
| JP | 5-269549 | 10/1993 |
| JP | 08-215801 | 8/1996 |
| JP | 09-271909 | * 10/1997 |

OTHER PUBLICATIONS

Patent Abstracts of Japan; Publication No. 2000077219; Filed Aug. 27, 1998; English Abstract of JP 10242353.

* cited by examiner

*Primary Examiner*—John P. Sheehan
(74) *Attorney, Agent, or Firm*—Harness, Dickey & Pierce, P.L.C.

(57) ABSTRACT

Disclosed herein is a cooling roll which can provide bonded a magnet having excellent magnetic properties and having excellent reliability. A melt spinning apparatus 1 is provided with a tube 2 having a nozzle 3 at the bottom thereof, a coil 4 for heating the tube and a cooling roll 5 having a circumferential surface 53 in which gas expelling grooves 54 are formed. A melt spun ribbon 8 is formed by injecting the molten alloy 6 from the nozzle 6 so as to be collided with the circumferential surface 53 of the cooling roll 5, so that the molten alloy 6 is cooled and then solidified. In this process, gas is likely to enter between a puddle 7 of the molten alloy 6 and the circumferential surface 53, but such gas is expelled by means of the gas expelling grooves 54.

12 Claims, 18 Drawing Sheets

COOLING ROLL, RIBBON-SHAPED MAGNETIC MATERIALS, MAGNETIC POWDERS AND BONDED MAGNETS

BACKGROUND OF THE INVENTION

1. Field of the Invention

The present invention relates to a cooling roll, ribbon-shaped magnetic materials, magnetic powders and bonded magnets. More specifically, the present invention relates to a cooling roll, a ribbon-shaped magnetic material formed by using the cooling roll, a magnetic powder formed from the magnetic material and a bonded magnet manufactured using the magnetic powder.

2. Description of the Prior Art

Rare-earth magnetic materials formed from alloys containing rare-earth elements have high magnetic properties. Therefore, when they are used for magnetic materials for motors, for example, the motors can exhibit high performance.

Such magnetic materials are manufactured by the quenching method using a melt spinning apparatus, for example. Hereinbelow, explanation will be made with regard to the manufacturing method using the melt spinning apparatus.

FIG. 20 is a sectional side view which shows the situation caused at or around a colliding section of a molten alloy with a cooling roll in the conventional melt spinning apparatus which manufactures a magnetic material using a single roll method.

As shown in this figure, in the conventional method, a magnetic material made of a predetermined alloy composition (hereinafter, referred to as "alloy") is melt and such a molten alloy 60 is injected from a nozzle (not shown in the drawing) so as to be collided with a circumferential surface 530 of a cooling roll 500 which is rotating relative to the nozzle in the direction indicated by the arrow A in FIG. 20. The alloy which is collided with the circumferential surface 530 is quenched and then solidified, thereby producing a ribbon-shaped alloy in a continuous manner. This ribbon-shaped alloy is called as a melt spun ribbon. Since the melt spun ribbon was quenched in a rapid cooling rate, its microstructure has a structure composed of an amorphous phase or a microcrystalline phase, so that it can exhibit excellent magnetic properties as it is or by subjecting it to a heating treatment. In this regard, it is to be noted that the dotted line in FIG. 20 indicates a solidification interface of the molten alloy 60.

The rare-earth elements are liable to oxidize. When they are oxidized, the magnetic properties thereof tend to be lowered. Therefore, normally, the manufacturing of the melt spun ribbon is carried out under an inert gas atmosphere. However, this causes the case that gas enters between the circumferential surface 530 and the puddle 70 of the molten alloy 60, which results in formation of dimples (depressions) 9 in the roll contact surface 810 of the melt spun ribbon 80 (that is, the surface of the melt spun ribbon which is in contact with the circumferential surface 530 of the cooling roll 500). This tendency becomes prominent as the peripheral velocity of the cooling roll 500 becomes large, and in such a case the area of the formed dimples becomes also larger.

In the case where such dimples 9 (especially, huge dimples) are formed, the molten alloy 60 can not sufficiently contact with the circumferential surface 530 of the cooling roll 500 at the locations of the dimples due to the existence of the entered gas, so that the cooling rate is lowered to prevent rapid solidification. As a result, at portions of the melt spun ribbon where such dimples are formed, the crystal grain size of the alloy becomes coarse, which results in lowered magnetic properties.

Magnetic powder obtained by milling such a melt spun ribbon having the portions of the lowered magnetic properties has larger dispersion or variation in its magnetic properties. Therefore, bonded magnet formed from such magnetic powder can have only poor magnetic properties, and corrosion resistance thereof is also low.

SUMMARY OF THE INVENTION

In view of the above problem involved in the prior art, it is an object of the present invention to provide a cooling roll which can manufacture a magnet having excellent magnetic properties and reliability, as well as a ribbon-shaped magnetic material manufactured using the cooling roll, a powdered magnetic material formed from the magnetic material and a bonded magnet formed from the powdered magnetic material.

In order to achieve the above object, the present invention is directed to a cooling roll for manufacturing a ribbon-shaped magnetic material by colliding a molten alloy to a circumferential surface of the cooling roll so as to cool and then solidify it, wherein the cooling roll has gas expelling means provided in the circumferential surface of the cooling roll for expelling gas entered between the circumferential surface and a puddle of the molten alloy.

According to the present invention described above, it is possible to provide a cooling roll which can manufacture magnets having excellent magnetic properties and reliability.

In the present invention, it is preferred that the cooling roll includes a roll base and an outer surface layer provided on an outer peripheral portion of the roll base, and said gas expelling means is provided in the outer surface layer. This makes it possible to manufacture magnets having especially excellent magnetic properties.

In this case, it is preferred that the outer surface layer of the cooling roll is formed of a material having a heat conductivity lower than the heat conductivity of the structural material of the roll base at or around a room temperature. This makes it possible to quench the molten alloy of the magnetic material with an appropriate cooling rate, thereby enabling to provide magnets having especially excellent magnetic properties.

Further, the outer surface layer of the cooling roll is preferably formed of a ceramics. This also makes it possible to quench the molten alloy of the magnetic material with an appropriate cooling rate, thereby enabling to provide magnets having especially excellent magnetic properties. Further, the durability of the cooling roll is also improved.

Further, in the present invention, it is preferred that the outer surface layer of the cooling roll is formed of a material having a heat conductivity equal to or less than 80 $W \cdot m^{-1} \cdot K^{-1}$ at or around a room temperature. This also makes it possible to quench the molten alloy of the magnetic material with an appropriate cooling rate, so that it is possible to provide magnets having especially excellent magnetic properties.

Furthermore, it is also preferred that the outer surface layer of the cooling roll is formed of a material having a coefficient of thermal expansion in the range of 3.5–18 [$\times 10^{-6} K^{-1}$] at or around a room temperature. According to this, the surface layer is firmly secured to the base roll of the cooling roll, so that peeling off of the surface layer can be effectively prevented.

In the present invention, it is also preferred that the average thickness of the outer surface layer of the cooling roll is 0.5 to 50 $\mu$m. This also makes it possible to quench the molten alloy of the magnetic material with an appropriate cooling rate, so that it is possible to provide magnets having especially excellent magnetic properties.

Moreover, it is also preferred that the outer surface layer of the cooling roll is manufactured without experience of machining process. Namely, according to the present invention, the surface roughness Ra of the circumferential surface of the cooling roll can be made small without machining process such as grinding or polishing.

In this case, preferably, the surface roughness Ra of a portion of the circumferential surface where the gas expelling means is not provided is 0.05–5 $\mu$m. This makes it possible to manufacture a ribbon-shaped magnetic material having an uniform thickness with suppressing formation of huge dimples. As a result, it becomes possible to provide magnets having especially excellent magnetic properties.

Further, in the present invention, it is preferred that the gas expelling means is formed from at least one groove. This makes it possible to effectively expel the gas that has entered between the puddle and the circumferential surface, so that it becomes possible to provide magnets having especially excellent magnetic properties.

In this case, the average width of the groove is preferably set to be 0.5–90 $\mu$m. This makes it possible to effectively expel the gas that has entered between the puddle and the circumferential surface of the cooling roll, so that it becomes possible to manufacture magnets having especially excellent magnetic properties.

Further, the average depth of the groove is preferably set to be 0.5–20 $\mu$m. This also makes it possible to effectively expel the gas that has entered between the puddle and the circumferential surface of the cooling roll, so that it becomes possible to manufacture magnets having especially excellent magnetic properties.

Furthermore, the angle defined by the longitudinal direction of the groove and the rotational direction of the cooling roll is preferably set to be equal to or less than 30 degrees. This also makes it possible to effectively expel the gas that has entered between the puddle and the circumferential surface of the cooling roll, so that it becomes possible to manufacture magnets having especially excellent magnetic properties.

Moreover, it is preferred that the groove is formed spirally with respect to the rotation axis of the cooling roll. According to such a structure, it is possible to form the cooling roll with the grooves relatively easily. Further, this also makes it possible to effectively expel the gas that has entered between the puddle and the circumferential surface of the cooling roll, so that it becomes possible to provide magnets having especially excellent magnetic properties.

Moreover, it is also preferred that the at least one groove includes a plurality of grooves which are arranged in parallel with each other through an average pitch of 0.5–100 $\mu$m. According to this arrangement of the grooves, it possible to make dispersion or variation in the cooling rates of the molten alloys at various portions of the cooling roll small, so that magnets having excellent magnetic properties can be manufactured.

Further, it is also preferred that the groove has openings located at the peripheral edges of the circumferential surface. This makes it possible to effectively prevent the gas that has once expelled from reentering between the puddle and the circumferential surface again, so that it becomes possible to manufacture magnets having especially excellent magnetic properties.

In these arrangements described above, it is preferred that the ratio of the projected area of the groove or grooves with respect to the projected area of the circumferential surface is 10–99.5%. This makes it possible to quench the molten alloy of the magnetic material with an appropriate cooling rate, so that it is possible to provide magnets having especially excellent magnetic properties.

The present invention is also directed to a ribbon-shaped magnetic material which is manufactured using the cooling roll as described above. By using such a ribbon-shaped magnetic material, it is possible to provide magnets having excellent magnetic properties and reliability.

In this case, it is preferred that the average thickness of the ribbon-shaped magnetic material is 8–50 $\mu$m. By using such a ribbon-shaped magnetic material, it is possible to provide magnets having more excellent magnetic properties and reliability.

Further, the present invention is also directed to a magnetic powder which is obtained by milling the ribbon-shaped magnetic material obtained as described above. By using such a magnetic powder, it is possible to provide magnets having excellent magnetic properties and reliability.

In this case, it is preferred that the magnetic powder is subjected to at least one heat treatment during or after the manufacturing process thereof. This makes it possible to provide magnets having more excellent magnetic properties.

Further, it is also preferred that the mean particle size of the magnetic powder lies within the range of 1–300 $\mu$m. This also makes it possible to provide magnets having more excellent magnetic properties.

Furthermore, it is also preferred that the magnetic powder has a composite structure which is composed of a hard magnetic phase and a soft magnetic phase. This makes it possible to provide magnets having especially excellent magnetic properties.

In this case, it is preferred that the average crystal grain size of each of the hard magnetic phase and the soft magnetic phase is 1–100 nm. This also makes it possible to provide magnets having excellent magnetic properties, especially excellent coercive force and rectangularity.

The present invention is also directed to a bonded magnet which is manufactured by binding the magnetic powder as described above with a binding resin. Such a bonded magnet has especially excellent magnetic properties and reliability.

In this case, it is preferred that the intrinsic coercive force ($H_{CJ}$) of the bonded magnet at a room temperature is in the range of 320–1200 kA/m. This makes it possible to provide a bonded magnet having excellent heat resistance and magnetizability as well as sufficient magnetic flux density.

In this case, it is preferred that the maximum magnetic energy product $(BH)_{max}$ of the bonded magnet is equal to or greater than 40 $kJ/m^3$. By using such a bonded magnet, it is possible to provide high performance small size motors.

These and other objects, structures and advantages of the present invention will be apparent from the following detailed description of the invention and the examples taken in conjunction with the appended drawings.

DETAILED DESCRIPTION OF THE INVENTION

Hereinbelow, embodiments of the cooling roll according to the present invention as well as embodiments of the ribbon-shaped magnetic material, magnetic powder and bonded magnet according to the present invention will be described in detail.

Structure of Cooling Roll

Figure 1:
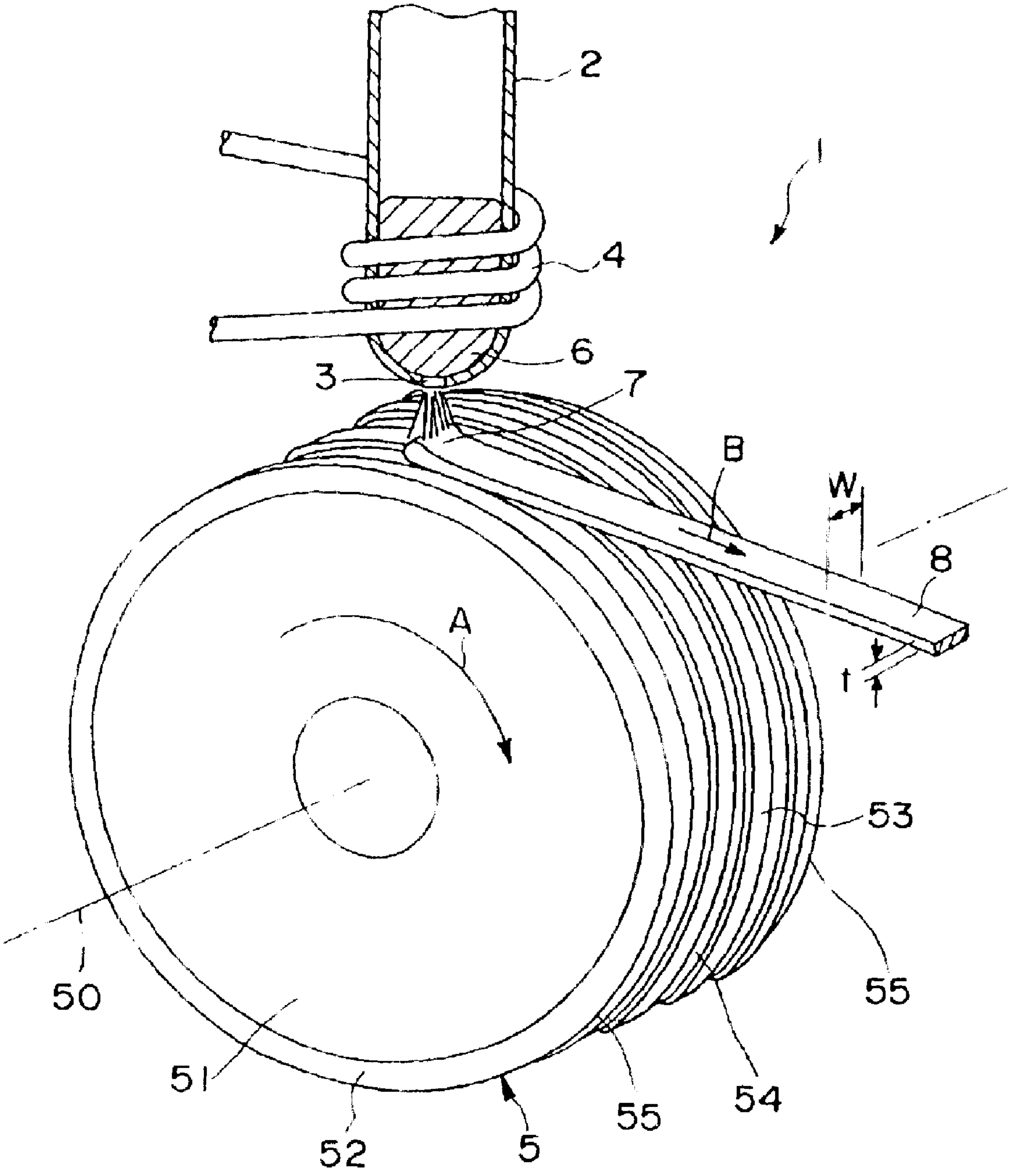
FIG. 1 is a perspective view showing an apparatus (melt spinning apparatus) for manufacturing a ribbon-shaped magnetic material provided with a cooling roll of a first embodiment of the present invention.
Figure 2:
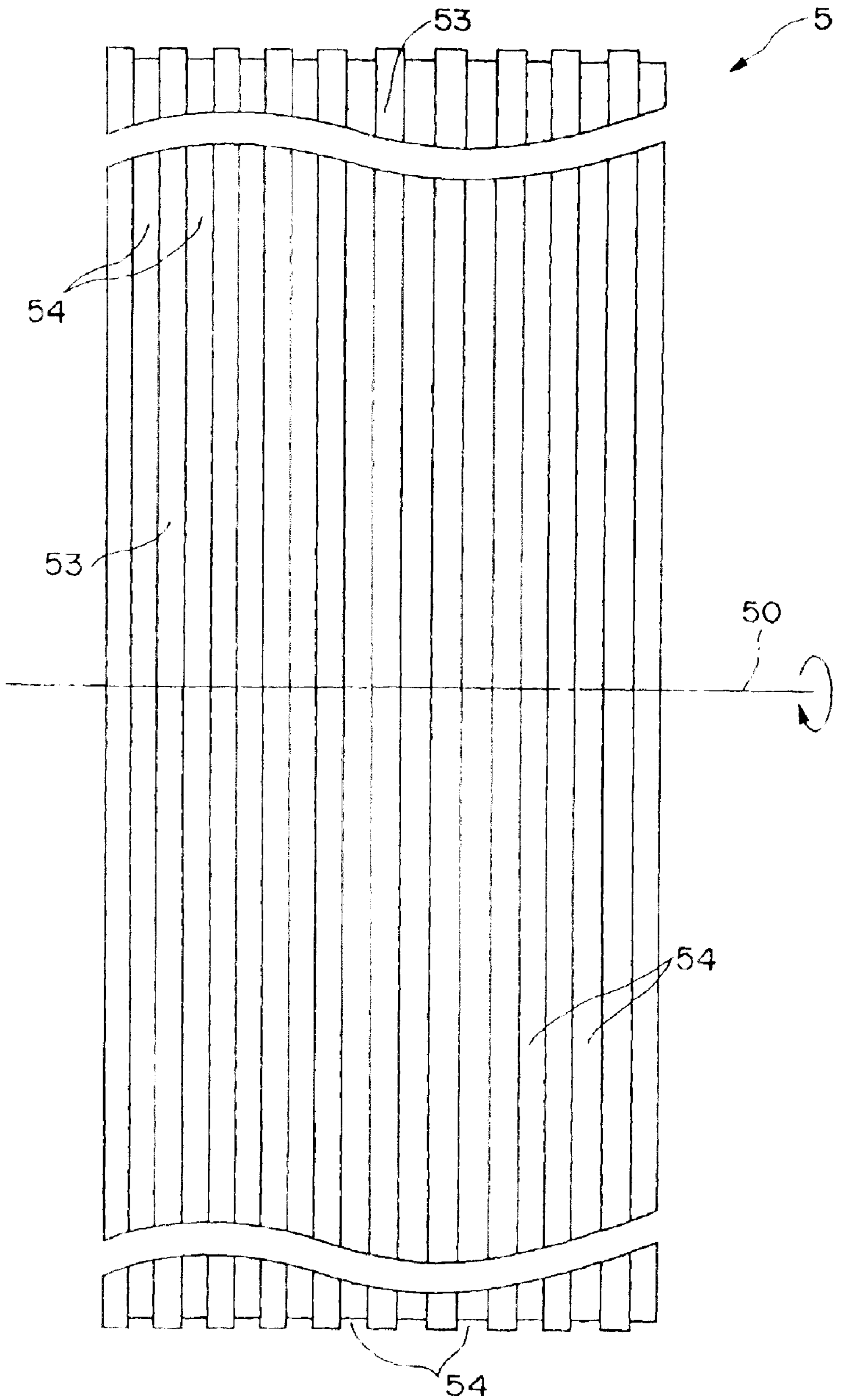
FIG. 2 is a front view of the cooling roll shown in FIG. 1.
Figure 3:
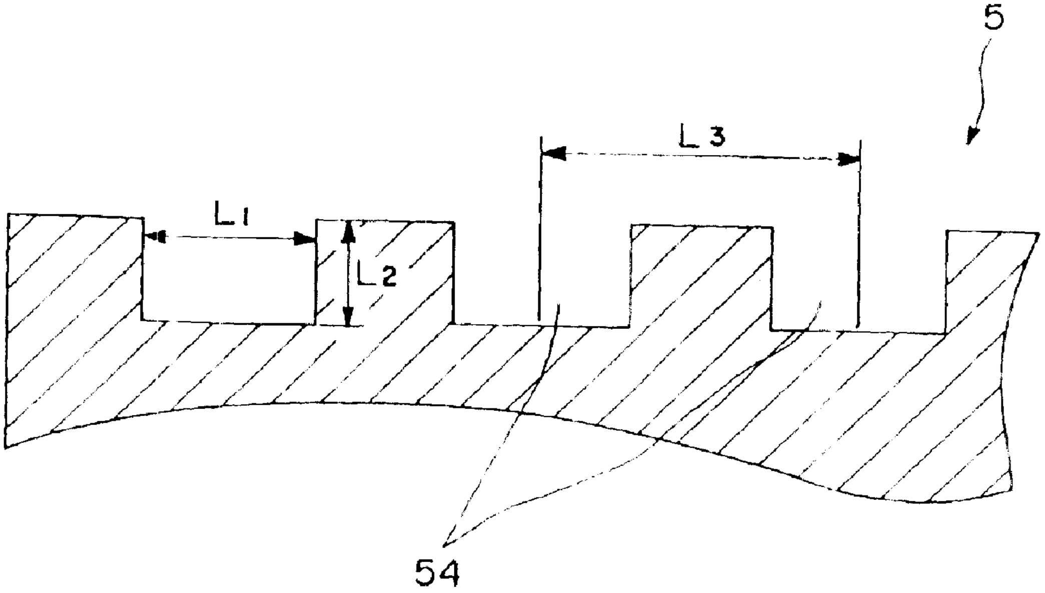
FIG. 3 is a sectional view which schematically shows the structure of a portion in the vicinity of the circumferential surface of the cooling roll shown in FIG. 1.

FIG. 1 is a perspective view showing a melt spinning apparatus which manufactures a ribbon-shaped magnetic material using a single roll method. The apparatus is provided with a cooling roll 5 of a first embodiment of the present invention. Further, FIG. 2 is a front view of the cooling roll shown in FIG. 1, and FIG. 3 is an enlarged sectional view of a portion of a circumferential surface of the cooling roll shown in FIG. 1.

In the circumferential surface 53 of the cooling roll 5, there is formed means for expelling gas which has entered between the circumferential surface 53 and a puddle 7 of a molten alloy 6.

By expelling the gas from between the circumferential surface 53 and the puddle 7 by means of the gas expelling means, the puddle 7 becomes capable of more reliably contacting with the circumferential surface 53 (this prevents formation of huge dimples). This means that differences in cooling rates at various portions of the puddle 7 become small. With this result, dispersion in the grain sizes (grain size distribution) of the obtained ribbon-shaped magnetic material 8 becomes also small, which makes it possible to obtain a melt spun ribbon 8 having relatively uniform magnetic properties.

In the example shown in the drawing, the gas expelling means includes grooves 54 formed on the circumferential surface 53. These grooves 54 are arranged substantially in parallel with the rotational direction of the cooling roll. By forming the gas expelling means from such grooves 54, gas which has been fed into the grooves 54 from between the circumferential surface 53 and the puddle 7 can be expelled along the longitudinal direction of each groove. Therefore, gas which has entered between the circumferential surface 53 and the puddle 7 can be expelled in a particularly high efficiency, thus resulting in improved contact of the puddle 7 with the circumferential surface 53.

In this connection, it is to be understood that although the cooling roll shown in the drawings has a plurality of grooves, at least one groove is sufficient in this invention.

The average value of the width $L_1$ of each groove 54 is preferably set to be 0.5–90 $\mu$m, more preferably 1–50 $\mu$m, and most preferably 3–25 $\mu$m. If the average value of the width $L_1$ of the groove 54 is less than the smallest value, there is a case that gas which has entered between the circumferential surface 53 and the puddle 7 can not be sufficiently expelled. On the other hand, if the average value of the width $L_1$ of the groove 54 exceeds the largest value, there is a case that the molten alloy 6 enters into the groove 54 so that the groove 54 will not function as the gas expelling means.

The average value of the depth (maximum depth) $L_2$ of each groove 54 is preferably set to be 0.5–20 $\mu$m, and more preferably 1–10 $\mu$m. If the average value of the depth $L_2$ of the groove 54 is less than the smallest value, there is a case that gas which has entered between the circumferential surface 53 and the puddle 7 can not be sufficiently expelled. On the other hand, if the average value of the depth $L_2$ of the groove 54 exceeds the largest value, the flow rate of the gas flowing in the groove increases so that the gas flow tends to be turbulent flow with eddies, which results in the case that huge dimples are liable to be formed on the surface of the melt spun ribbon 8.

The average value of the pitch (maximum pitch) $L_3$ between the adjacent grooves 54 is preferably set to be 0.5–100 μm, and more preferably 3–50 μm. If the average value of the pitch $L_3$ is within these values, each groove 54 effectively functions as the gas expelling means, and the interval between the contacting portion and the non-contacting portion of the puddle 7 with respect to the circumferential surface can be made sufficiently small. With this result, the difference in the cooling rates at the contacting portion and the non-contacting portion becomes sufficiently small, so that it is possible to obtain a melt spun ribbon 8 having small dispersion in its grain sizes and magnetic properties.

The ratio of the area of the grooves 54 with respect to the area of the circumferential surface 53 when they are projected on the same plane is preferably set to be 10–99.5%, and more preferably 30–95%. If the ratio of the projected area of the grooves with respect to the projected area of the circumferential surface 53 is less than the lower limit value, the cooling rate of the melt spun ribbon 8 in the vicinity of its roll contact surface 81 (which is a surface of the melt spun ribbon to be in contact with the circumferential surface of the cooling roll) becomes large so that such a portion is liable to have an amorphous structure. Further, in the vicinity of the free surface 82 of the melt spun ribbon 8 (which is a surface of the melt spun ribbon opposite to the roll contact surface), the crystal grain size becomes coarse due to the relatively lower cooling rate therein as compared with that in the vicinity of the roll contact surface 81, thus leading to the case that magnetic properties are lowered.

Various methods can be used for forming the grooves 54. Examples of the methods include various machining processes such as cutting, transfer (pressure rolling), gliding, blasting and the like, laser processing, electrical discharge machining, and chemical etching and the like. Among these methods, the machining process, especially gliding is particularly preferred, since according to the gliding the width and depth of each groove and the pitch of the adjacent grooves can be relatively easily adjusted with high precision as compared with other methods.

Surface Roughness

The surface roughness Ra of the circumferential surface 53 other than portions in which the grooves 54 are formed is not limited to a particular value, but it is preferred that the surface roughness Ra is set to be 0.05–5 μm, and more preferably 0.07–2 μm. If the surface roughness Ra is lower than the lower limit value, the puddle 7 can not be sufficiently in contact with the cooling roll 5, which results in the case that formation of huge dimples can not be suppressed effectively. On the other hand, if the surface roughness Ra is larger than the upper limit value, dispersion in the thickness of the melt spun ribbon 8 becomes prominent, thus resulting in the case that dispersion in the grain sizes and dispersion in the magnetic properties become large.

Material of the Cooling Roll

The cooling roll 5 is constructed from a roll base 51 and a surface layer 52 which constitutes the circumferential surface 53 of the cooling roll 5.

The surface layer 52 may be formed from the same material as that for the roll base 51. However, it is preferred that the surface layer 52 is formed from a material having a lower heat conductivity than that of the material for the roll base 51.

The material for the roll base 51 is not limited to a particular material. However, it is preferred that the roll base 51 is formed form a metal material having a high heat conductivity such as copper or copper alloys in order to make it possible to dissipate the heat generated in the surface layer 52 as soon as possible.

The heat conductivity of the material of the surface layer 52 at or around a room temperature is not particularly limited to a specific value. However, it is preferable that the heat conductivity is equal to or less than 80 $W \cdot m^{-1} \cdot K^{-1}$, it is more preferable that the heat conductivity lies within the range of 3–60 $W \cdot m^{-1} \cdot K^{-1}$ and it is most preferable that the heat conductivity lies within the range of 5–40 $W \cdot m^{-1} \cdot K^{-1}$.

By constructing the cooling roll 5 from the surface layer 52 and the roll base 51 each having the heat conductivity as described above, it becomes possible to quench the molten alloy 6 in an appropriate cooling rate. Further, the difference between the cooling rates at the vicinity of the roll contact surface 81 and at the vicinity of the free surface 82 becomes small. Consequently, it is possible to obtain a melt spun ribbon 8 having less dispersion in its crystal grain sizes at various portions thereof and having excellent magnetic properties.

Examples of the materials having such heat conductivity include metal materials such as Zr, Sb, Ti, Ta, Pd, Pt and alloys of such metals, metallic oxides of these metals, and ceramics. Examples of the ceramics include oxide ceramics such as $Al_2O_3$, $SiO_2$, $TiO_2$, $Ti_2O_3$, $ZrO_2$ $Y_2O_3$, barium titanate, and strontium titanate and the like; nitride ceramics such as AlN, $Si_3N_4$, TiN, BN, ZrN, HfN, VN, TaN, NbN, CrN, $Cr_2N$ and the like; carbide ceramics such as graphite, SiC, ZrC, $Al_4C_3$, $CaC_2$, WC, TiC, HfC, VC, TaC, NbC and the like; and mixture of two or more of these ceramics. Among these ceramics, nitride ceramics and materials containing it are particularly preferred.

As compared with the conventional materials used for constituting the circumferential surface of the cooling roll (that is, Cu, Cr or the like), these ceramics have high hardness and excellent durability (anti-abrasion characteristic). Therefore, even if the cooling roll 5 is repeatedly used, the shape of the circumferential surface 53 can be maintained, and therefore the effect of the gas expelling means will be scarcely deteriorated.

Further, normally, the materials which can be used for the cooling roll 51 described above have high coefficient of thermal expansion. Therefore, it is preferred that the coefficient of thermal expansion of the material of the surface layer 52 is close to that of the material of the roll base 51. For example, the coefficient of thermal expansion (coefficient of linear expansion $\alpha$) at or around a room temperature is preferably in the range of 3.5–18[$\times 10^{-6} K^{-1}$], and more preferably in the range of 6–12[$\times 10^{-6} K^{-1}$]. When the coefficient of thermal expansion of the material of the surface layer 52 at or around a room temperature lies within this range, it is possible to maintain reliable bonding between the roll base 51 and the surface layer 52, thereby enabling to prevent peeling off of the surface layer 52 effectively.

The surface layer 52 may be formed from a laminate having a plurality of layers of different compositions, besides the single layer structure described above. For example, such a surface layer 52 may be formed from two or more layers which include a layer of the metallic material and a layer of the ceramic material described above. Example of such a two layer laminate structure of the surface layer 52 includes a laminate composed of a lower layer of the metallic material located at the side of the roll base 51 and an upper layer of the ceramic material. In this case, it is preferred that these adjacent layers are well adhered to each other. For this purpose, these adjacent layers may contain the same element therein.

Further, when the surface layer 52 is formed into such a laminate structure comprised of a plurality of layers, it is preferred that at least the outermost layer is formed from the material having the heat conductivity within the range described above.

Furthermore, in the case where the surface layer 52 is formed into the single layer structure described above, it is not necessary for the composition of the material of the surface layer to have uniform distribution in the thickness direction thereof. For example, the contents of the constituents may be gradually changed in the thickness direction thereof (that is, graded materials may be used).

The average thickness of the surface layer 52 (in the case of the laminate structure, the total thickness thereof) is not limited to a specific value. However, it is preferred that the average thickness lies within the range of 0.5–50μm, and more preferably 1–20 μm.

If the average thickness of the surface layer 52 is less than the lower limit value described above, there is a possibility that the following problems will be raised. Namely, depending on the material to be used for the surface layer 52, there is a case that cooling ability becomes too high. When such a material is used for the surface layer 52, a cooling rate becomes too large at the vicinity of the roll contact surface 81 of the melt spun ribbon 8 even though it has a considerably large thickness, thus resulting in the case that amorphous structure be produced at that portion. On the other hand, in the vicinity of the free surface 82 of the spun ribbon 8 where the cooling rate is relatively low, the cooling rate becomes small as the thickness of the melt spun ribbon 8 increases, so that crystal grain size is liable to be coarse. Namely, this leads to the case that the grain size is liable to be coarse in the vicinity of the free surface 82 of the obtained melt spun ribbon 8 and that amorphous structure is liable to be produced in the vicinity of the roll contact surface 81 of the melt spun ribbon 8. In this regard, even if the thickness of the melt spun ribbon 8 is made small by increasing the peripheral velocity of the cooling roll 5, for example, in order to reduce the crystal grain size at the vicinity of the free surface 82 of the melt spun ribbon 8, this in turn leads to the case that the melt spun ribbon 8 has more random amorphous structure at the vicinity of the roll contact surface 81 of the obtained melt spun ribbon 8. In such a melt spun ribbon 8, there is a case that sufficient magnetic properties will not be obtained even if it is subjected to a heat treatment after manufacturing thereof.

Further, if the average thickness of the surface layer 52 exceeds the above upper limit value, the cooling rate becomes slow and thereby the crystal grain size becomes coarse, thus resulting in the case that magnetic properties are poor.

Figure 4:
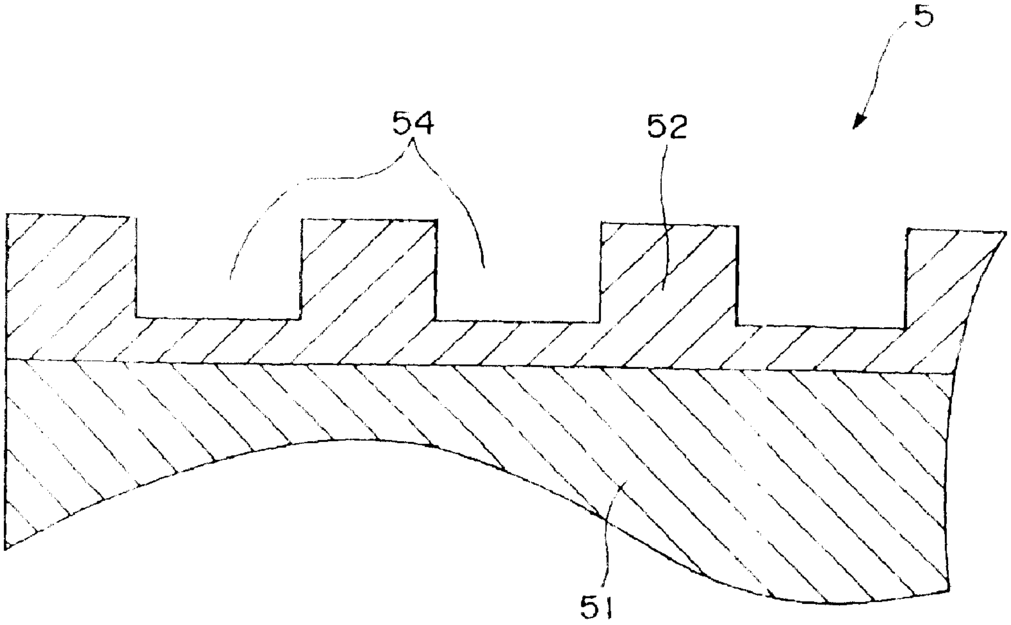
FIG. 4 is an illustration for explaining a method of forming a gas expelling means.
Figure 5:
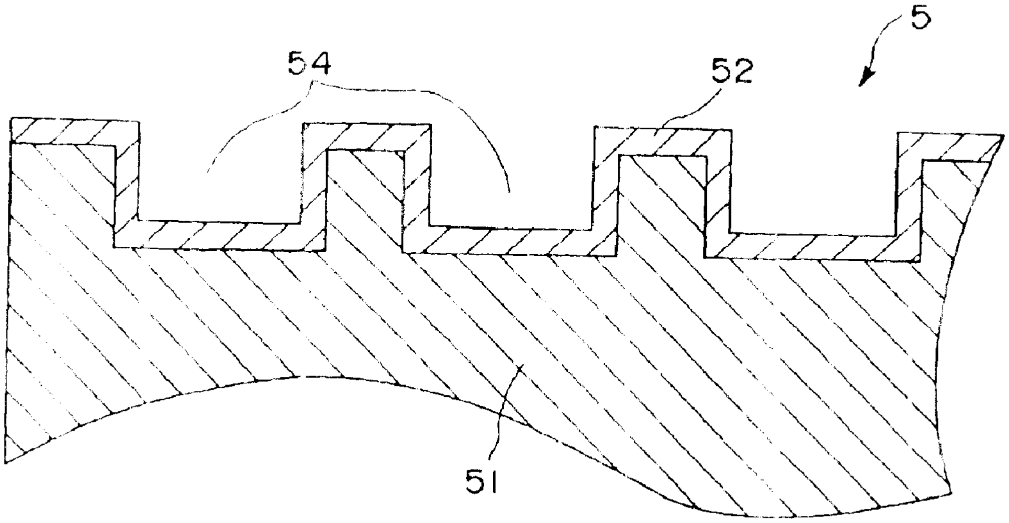
FIG. 5 is an illustration for explaining another method of forming a gas expelling means.

In the case where the surface layer 52 is provided on the outer circumferential surface of the roll base 51 (that is, the case where the surface layer 52 is not integrally formed with the roll base 51), the grooves 54 may be directly formed in the surface layer 52 by means of the method described above, or may be formed by using other way. Specifically, as shown in FIG. 4, after the formation of the surface layer 52, the grooves 54 can be formed in the surface layer 52 by means of the method described above. Alternatively, as shown in FIG. 5, it is also possible to form grooves 54 onto the outer circumferential surface of the roll base 51 by means of the method described above, and then to form a surface layer 52 thereon. In the latter way, the thickness of the surface layer 52 is made small in comparison with the depth of each groove 54 formed in the roll base 51. With this result, the grooves 54 as the gas expelling means can be formed in the circumferential surface 53 without performing any machining work for the surface of the surface layer 52. According to this way, since no machining work is performed for the surface of the surface layer 52, the surface roughness Ra of the circumferential surface 53 can be made considerably small without polishing which is normally made in the final stage.

In this connection, it is to be noted that since FIG. 3 is a view for explaining the structure of the cross section of the cooling roll in the vicinity of the circumferential surface thereof, a boundary surface between the roll base and the surface layer is omitted from the drawing (in the same manner as FIGS. 7, 9, 11, 13 and 14).

The method for forming the surface layer 52 is not limited to a specific method. However, it is preferable to employ a chemical vapor deposition (CVD) method such as heat CVD, plasma CVD, and laser CVD and the like, or a physical vapor deposition method (PVD) such as vapor deposition, spattering and ion-plating and the like. According to these methods, it is possible to obtain a surface layer having an uniform thickness with relative ease, so that it is not necessary to perform machining work onto the surface thereof after formation of the surface layer 52. Further, the surface layer 52 may be formed by means of other method such as electro plating, immersion plating, elecroless plating, and metal spraying and the like. Among these methods, the metal spraying is particularly preferred. This is because when the surface layer 52 is formed by means of the method, the surface layer 52 can be firmly bonded to the roll base 51.

Further, prior to the formation of the surface layer 52 onto the outer circumferential surface of the roll base 51, a pre-treatment may be made to the outer surface of the roll base 51. Examples of such a pre-treatment include washing treatment such as alkaline wash, oxide wash and wash using organic solvent and the like, and primer treatment such as blasting, etching and formation of a plating layer and the like. In this way, the surface layer 52 is more firmly bonded with the roll base 51 after the formation of the surface layer 52. In addition, by carrying out the primer treatment as described above, it becomes possible to form an uniform and precise surface layer 52, so that the obtained cooling roll 5 has less dispersion in its heat conductivities at various portions thereof.

Alloy Composition of Magnetic Material

In this invention, it is preferred that the ribbon-shaped magnetic material and the magnetic powder according to the present invention have excellent magnetic properties. For this purpose, it is preferred that they are formed from alloys containing R (here, R is at least one of the rare-earth elements containing Y). Among these alloys, alloys containing R (here, R is at least one of the rare-earth elements containing Y), TM (here, TM is at least one of transition metals) and B (Boron) are particularly preferred. In this case, any one of the following alloys is preferably used.

(1) An alloy containing as basis components thereof a rare-earth element mainly containing Sm and a transition meal mainly containing Co (hereinafter, referred to "as Sm—Co based alloys").

(2) An alloy containing as basic components thereof R (here, R is at least one of the rare-earth elements containing Y), a transition metal mainly containing Fe (TM) and B (hereinafter, referred to as "R-TM-B based alloys").

(3) An alloy containing as basic components thereof a rare-earth element mainly containing Sm, a transition metal mainly containing Fe and an interstitial element mainly containing N (hereinafter, referred to as "Sm—Fe—N based alloys").

(4) An alloy containing as major components thereof R (here, R is at least one of the rare-earth elements containing Y) and a transition meal such as Fe and having a nanocomposite structure in which a soft magnetic phase and a hard magnetic phase are adjacently existed (including the case where they are adjoined through an intergranular boundary phase).

(5) A mixture of two or more of the above-mentioned alloy compositions (1) to (4). In this case, the advantages of the alloy compositions to be mixed can be enjoyed, so that more excellent magnetic properties can be obtained easily.

Typical examples of the Sm—Co based alloys include $SmCo_5$, $Sm_2TM_{17}$ (here, TM is a transition metal).

Typical examples of the R—Fe—B based alloys include Nd—Fe—B based alloys, Pr—Fe—B based alloys, Nd—Pr—Fe—B based alloys, Nd—Dy—Fe—B based alloys, Ce—Nd—Fe—B based alloys, Ce—Pr—Nd—Fe—B based alloys, and one of these alloys in which a part of Fe is replaced with other transition metal such as Co or Ni or the like.

Typical examples of the Sm—Fe—N based alloys include $Sm_2Fe_{17}N_3$ which is formed by nitrifying a $Sm_2Fe_{17}$ alloy and Sm—Zr—Fe—Co—N based alloys having a $TbCu_7$ phase. In this regard, in the case of the Sm—Fe—N based alloys, normally N is introduced with the form of interstitial atom by subjecting the melt spun ribbon to an appropriate heat treatment to nitrify it after the melt spun ribbon has been manufactured.

In this connection, examples of the rare-earth elements mentioned above include Y, La, Ce, Pr, Nd, Pm, Sm, Eu, Gd, Tb, Dy, Ho, Er, Tm, Yb, Lu, and a misch metal, and one or more of these rare-earth metals may be contained. Further, examples of the transition metals include Fe, Co, Ni and the like, and one or more of these metals may be contained.

Further, in order to enhance magnetic properties such as coercive force and maximum energy product and the like, or in order to improve heat resistance and corrosion resistance, the magnetic materials may contain Al, Cu, Ga, Si, Ti, V, Ta, Zr, Nb, Mo, Hf, Ag, Zn, P, Ge, Cr and W, as needed.

Figure 6:
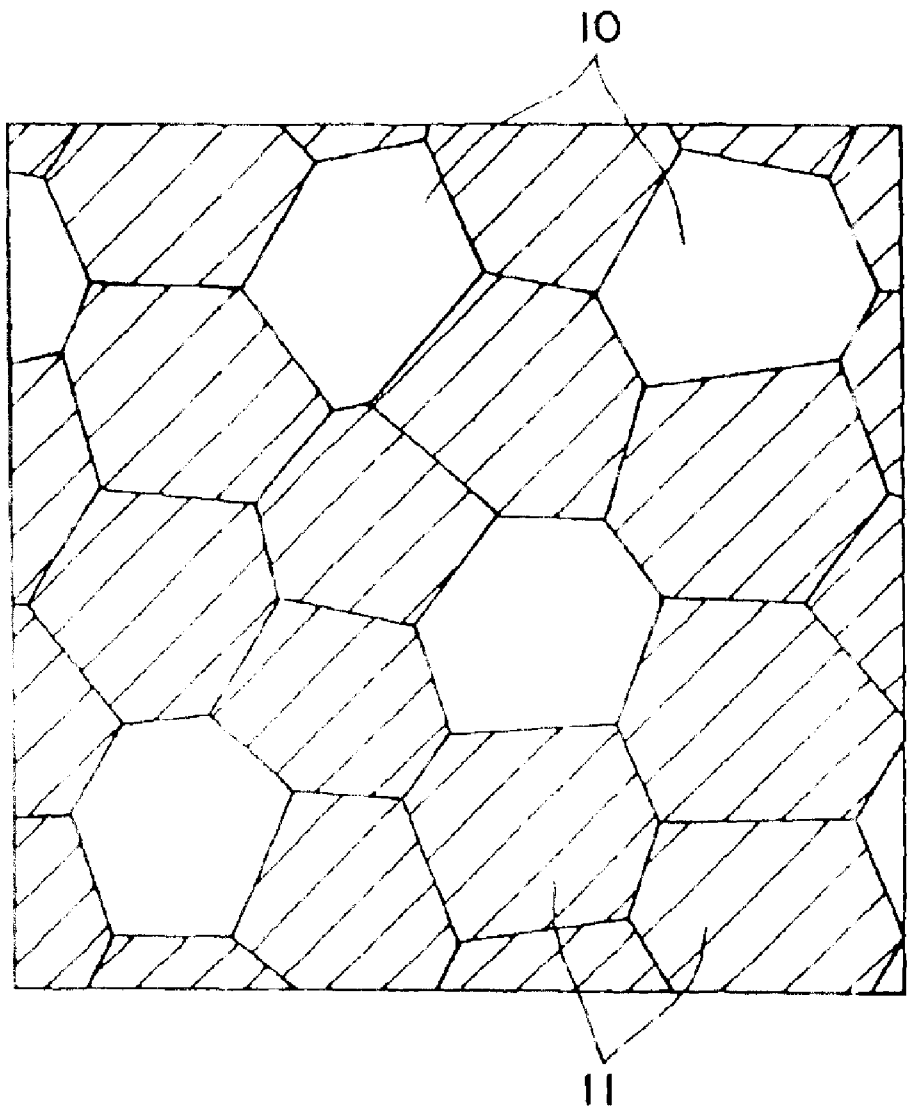
FIG. 6 is an illustration which schematically shows one example of the composite structure (nanocomposite structure) of the magnetic powder of the present invention.
Figure 7:
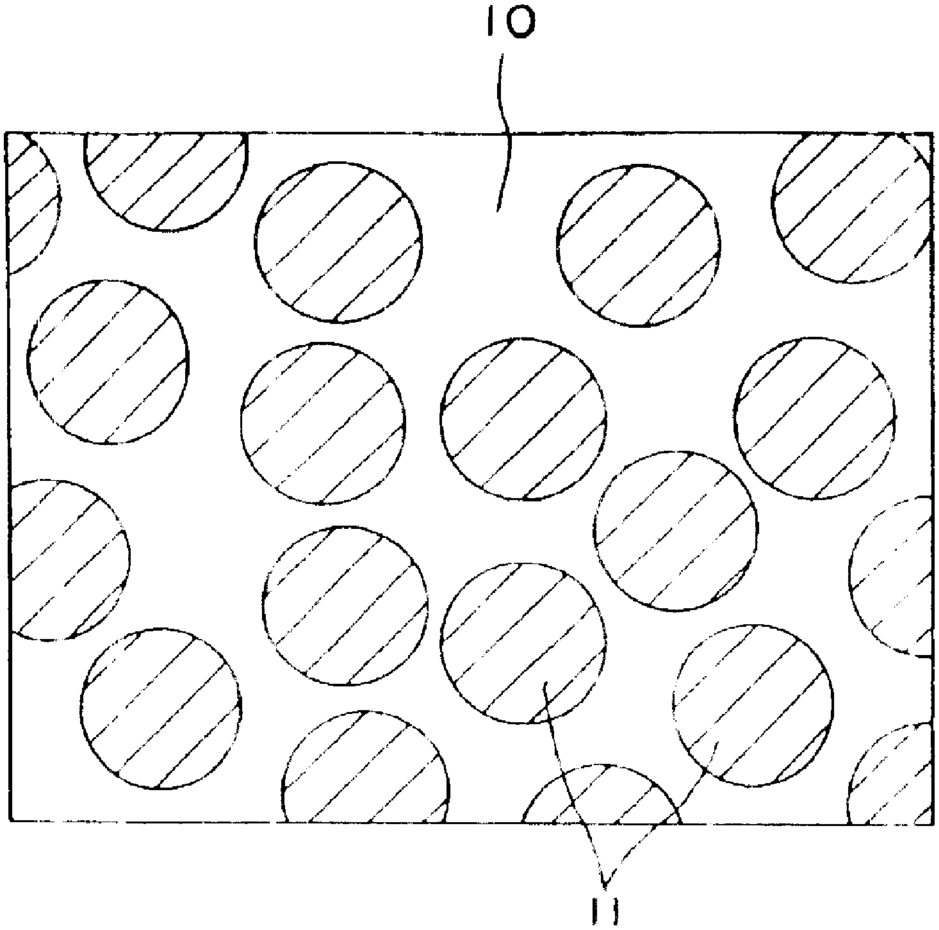
FIG. 7 is an illustration which schematically shows another example of the composite structure (nanocomposite structure) of the magnetic powder of the present invention.
Figure 8:
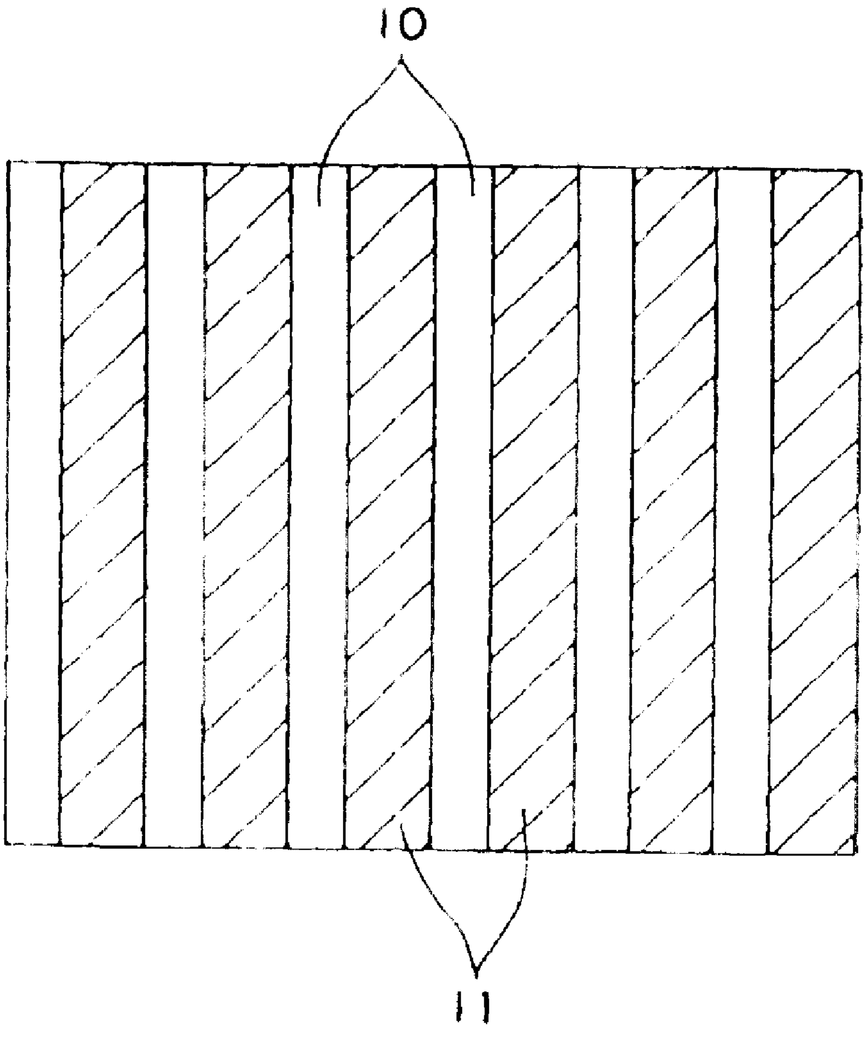
FIG. 8 is an illustration which schematically shows the other example of the composite structure (nanocomposite structure) of the magnetic powder of the present invention.

In this composite structure (nanocomposite structure), a soft magnetic phase 10 and a hard magnetic phase 11 exist with a pattern (model) as shown in, for example, FIG. 6, FIG. 7 or FIG. 8, in which the thickness of the respective phases and the grain sizes therein are on the order of nanometers. Further, the soft magnetic phase 10 and the hard magnetic phase 11 are arranged adjacent to each other (this also includes the case where these phases are adjacent through intergranular boundary phase), which makes it possible to perform magnetic exchange interaction therebetween.

The magnetization of the soft magnetic phase readily changes its orientation by the action of an external magnetic field. Therefore, when the soft magnetic phase coexists with the hard magnetic phase, the magnetization curve for the entire system shows a stepped "serpentine curve" in the second quadrant of the B-H diagram (J-H diagram). However, when the soft magnetic phase has a sufficiently small size of less than several tens of nm, magnetization of the soft magnetic phase is sufficiently and strongly constrained through the coupling with the magnetization of the surrounding hard magnetic phase, so that the entire system exhibits functions like a hard magnetic material.

A magnet having such a composite structure (nanocomposite structure) has mainly the following five features.

(1) In the second quadrant of the B-H diagram (J-H diagram), the magnetization springs back reversively (in this sense, such a magnet is also referred to as a "spring magnet").

(2) It has a satisfactory magnetizability, so that it can be magnetized with a relatively low magnetic field.

(3) The temperature dependence of the magnetic properties is small as compared with the case where the system is constituted from a hard magnetic phase alone.

(4) The changes in the magnetic properties with the elapse of time are small.

(5) No deterioration in the magnetic properties is observable even if it is finely milled.

As described above, the magnets composed of the composite structure have excellent magnetic properties. Therefore, it is preferred that the magnetic powders according to the present invention have such a composite structure.

In this regard, it is to be understood that the patterns shown in FIGS. 6 to 8 are mere examples, and the composite structure is not limited thereto.

Manufacture of Ribbon-Shaped Magnetic Material

Hereinbelow, description will be made with regard to the manufacturing of the ribbon-shaped magnetic material (that is, melt spun ribbon) using the cooling roll 5 described above.

The ribbon-shaped magnetic material is manufactured by colliding a molten alloy of the magnetic material onto the circumferential surface of the cooling roll to cool and then solidify it. Hereinbelow, one example thereof will be described.

As shown in FIG. 1, the melt spinning apparatus 1 is provided with a cylindrical body 2 capable of storing the magnetic material, and a cooling roll 5 which rotates in the direction of an arrow A in the figure relative to the cylindrical body 2. A nozzle (orifice) 3 which injects the molten alloy 6 of the magnetic material (alloy) is formed at the lower end of the cylindrical body 2.

In addition, on the outer periphery of the cylindrical body 2, there is provided a heating coil 4 for heating (inductively heating) the magnetic material in the cylindrical body 2.

Such a melt spinning apparatus 1 is installed in a chamber (not shown), and it is operated under the condition where the interior of the chamber is filled with an inert gas or other kind of ambient gas. In particular,in order to prevent oxidation of a melt spun ribbon 8, it is preferable that the ambient gas is an inert gas. Examples of such an inert gas include argon gas, helium gas, nitrogen gas or the like.

The pressure of the ambient gas is not particularly limited to a specific value, but 1–760 Torr is preferable.

A predetermined pressure which is higher than the internal pressure of the chamber is applied to the surface of the liquid of the molten alloy 6 in the cylindrical body 2. The molten alloy 6 is injected from the nozzle 3 by the differential pressure between the pressure of the ambient gas in the chamber and the summed pressure of the pressure applied to the surface of the liquid of the molten alloy 6 in the cylindrical body 2 and the pressure exerted in the cylindrical body 2 in proportion to the liquid level.

The molten alloy injecting pressure (that is, the differential pressure between the pressure of the ambient gas in the chamber and the summed pressure of the pressure applied to the surface of the liquid of the molten alloy 6 in the cylindrical body 2 and the pressure exerted in the cylindrical body 2 in proportion to the liquid level) is not particularly limited to a specific value, but 10–100 kPa is preferable.

In the melt spinning apparatus 1, a magnetic material (alloy) is placed in the cylindrical body 2 and melted by heating with the coil 4, and then the molten alloy 6 is discharged from the nozzle 3. Then, as shown in FIG. 1, the molten alloy 6 collides with the circumferential surface 53 of the cooling roll 5, and after the formation of a puddle 7, the molten alloy 6 is cooled down rapidly to be solidified while being dragged along the circumferential surface 53 of the rotating cooling roll 5, thereby forming the melt spun ribbon 8 continuously or intermittently. Under the situation, gas which has entered between the puddle 7 and the circumferential surface 53 is expelled or discharged to the outside through the grooves 54 (gas expelling means). The roll contact surface 81 of the melt spun ribbon 8 thus formed is soon released from the circumferential surface 53, and the melt spun ribbon 8 proceeds in the direction of an arrow B in FIG. 1.

Since the gas expelling means is provided in this way, the puddle 7 can be reliably in contact with the circumferential surface 53 to prevent formation of huge dimples. Further, uniform cooling of the puddle 7 is also prevented. As a result, it is possible to obtain a melt spun ribbon 8 having high magnetic properties.

In this connection, it is to be noted that when manufacturing such a melt spun ribbon 8, it is not always necessary to install the nozzle 3 just above the rotation axis 50 of the cooling roll 5.

The optimum range of the peripheral velocity of the cooling roll 5 depends upon the composition of the molten alloy, the structural material (composition) of the surface layer 52, and the surface condition of the circumferential surface 53 (especially, the wettability of the surface layer 52 with respect to the molten alloy 6), and the like. However, for the enhancement of the magnetic properties, a peripheral velocity in the range of 5 to 60 m/s is normally preferable, and 10 to 40 m/s is more preferable. If the peripheral velocity of the cooling roll 5 is less than the above lower limit value, the cooling rate of the molten alloy 6 is decreased. This tends to increase the crystal grain size, thus leading to the case that the magnetic properties are lowered. On the other had, when the peripheral velocity of the cooling roll 5 exceeds the above upper limit value, the cooling rate is too high, and thereby amorphous structure becomes dominant. In this case, the magnetic properties can not be sufficiently improved even if a heat treatment described below is given in the later stage.

It is preferred that thus obtained melt spun ribbon 8 has uniform width w and thickness t. In this case, the average thickness t of the melt spun ribbon 8 should preferably lie in the range of 8–50 μm and more preferably lie in the range of 10–40 μm. If the average thickness t is less than the lower limit value, amorphous structure becomes dominant, so that there is a case that the magnetic properties can not be sufficiently improved even if a heat treatment is given in the later stage. Further, productivity per an unit time is also lowered. On the other hand, if the average thickness t exceeds the above upper limit value, the crystal grain size at the side of the roll contact surface 81 of the melt spun ribbon 8 tends to be coarse, so that there is a case that the magnetic properties are lowered.

Further, the obtained melt spun ribbon 8 may be subjected to at least one heat treatment for the purpose of, for example, acceleration of recrystallization of the amorphous structure and homogenization of the structure. The conditions of this heat treatment may be, for example, a heating in the range of 400 to 900° C. for 0.5 to 300 min.

Moreover, in order to prevent oxidation, it is preferred that this heat treatment is performed in a vacuum or under a reduced pressure (for example, in the range of $1\times10^{-1}$ to $1\times10^{-6}$ Torr), or in a nonoxidizing atmosphere of an inert gas such as nitrogen gas, argon gas, helium gas or the like.

The melt spun ribbon (ribbon-shaped magnetic material) 8 obtained as in the above has a microcrystalline structure or a structure in which microcrystals are included in an amorphous structure, and exhibits excellent magnetic properties.

In the foregoing, the description was made with reference to the single roll method. However, it is of course possible to use a twin roll method. According to these quenching methods, the metallic structure (that is, crystal grain) can be formed into microstructure, so that these methods are particularly effective in improving magnetic properties of bonded magnets, especially coercive force thereof.

Manufacture of Magnetic Powder

The magnetic powder of this invention is obtained by milling the melt spun ribbon 8 which is manufactured as described above.

The milling method of the melt spun ribbon is not particularly limited, and various kinds of milling or crushing apparatus such as ball mill, vibration mill, jet mill, and pin mill may be employed. In this case, in order to prevent oxidation, the milling process may be carried out in vacuum or under a reduced pressure (for example, under a reduced pressure of $1\times10^{-1}$ to $1\times10^{-6}$ Torr), or in a nonoxidizing atmosphere of an inert gas such as nitrogen, argon, helium, or the like.

The average particle size (diameter) of the magnetic powder is not particularly limited. However, in the case where the magnetic powder is used for manufacturing bonded magnets (rare-earth bonded magnets) described later, in order to prevent oxidation of the magnetic powder and deterioration of the magnetic properties during the milling process it is preferred that the average particle size lies within the range of 1 to 300 μm, more preferably within the range of 5 to 150 μm.

In order to obtain a better moldability of the bonded magnet, it is preferable to give a certain degree of dispersion to the particle size distribution of the magnetic powder. By so doing, it is possible to reduce the void ratio (porosity) of the bonded magnet obtained. As a result, it is possible to increase the density and the mechanical strength of the bonded magnet as compared with a bonded magnet having the same content of the magnetic powder, thereby enabling to further improve the magnetic properties.

Thus obtained magnetic powder may be subjected to a heat treatment for the purpose of, for example, removing the influence of stress introduced by the milling process and controlling the crystal grain size. The conditions of the heat treatment are, for example, heating at a temperature in the range of 350 to 850° C. for 0.5 to 300 min.

In order to prevent oxidation of the magnetic powder, it is preferable to perform the heat treatment in a vacuum or under a reduced pressure (for example, in the range of $1\times10^{-1}$ to $1\times10^{-6}$ Torr), or in a nonoxidizing atmosphere of an inert gas such as nitrogen gas, argon gas, and helium gas.

Thus obtained magnetic powder has a satisfactory bindability with binding resins (wettability of binding resins). Therefore, when a bonded magnet is manufactured using the magnetic powder described above, the bonded magnet has high mechanical strength as well as excellent thermal stability (heat resistance) and corrosion resistance. Consequently, it can be concluded that the magnetic powder is suitable for the manufacture of the bonded magnet, and the manufactured bonded magnet has high reliability.

In such magnetic powder as described above, the average crystal grain size of the magnetic powder should preferably be equal to or less than 500 nm, more preferably equal to or less than 200 nm, and most preferably lie in the range of 10–120 nm. If the average crystal grain size exceeds 500 nm, there is a case that magnetic properties, especially coercive force and rectangularity can not be sufficiently improved.

In particular, when the magnetic material is an alloy having the composite structure as described (4) in the above, the average crystal grain size should preferably lie in the range of 1–100 nm, and more preferably lie in the range of 5–50 nm. When the average crystal grain size lies in this range, more effective magnetic exchange interaction occurs between the soft magnetic phase 10 and the hard magnetic phase 11, so that markedly improved magnetic properties can be recognized.

Bonded Magnet and Manufacturing Thereof

Hereinbelow, a description will be made with regard to the bonded magnet according to the present invention.

The bonded magnet according to the present invention is manufactured by binding the magnetic powder described above using a binding resin (binder).

As for the binder, either of a thermoplastic resin or a thermosetting resin may be employed.

Examples of the thermoplastic resin include polyamid (example: nylon 6, nylon 46, nylon 66, nylon 610, nylon 612, nylon 11, nylon 12, nylon 6–12, nylon 6–66); thermoplastic polyimide; liquid crystal polymer such as aromatic polyester; poly phenylene oxide; poly phenylene sulfide; polyolefin such as polyethylene, polypropylene and ethylene-vinyl acetate copolymer; modified polyolefin; polycarbonate; poly methyl methacrylate; polyester such as poly ethylen terephthalate and poly butylene terephthalate; polyether; polyether ether ketone; polyetherimide; polyacetal; and copolymer, blended body, and polymer alloy having at least one of these materials as a main ingredient. In this case, a mixture of two or more kinds of these materials may be employed.

Among these resins, a resin containing polyamide as its main ingredient is particularly preferred from the viewpoint of especially excellent moldability and high mechanical strength. Further, a resin containing liquid crystal polymer and/or poly phenylene sulfide as its main ingredient is also preferred from the viewpoint of enhancing the heat resistance. Furthermore, these thermoplastic resins also have an excellent kneadability with the magnetic powder.

These thermoplastic resins provide an advantage in that a wide range of selection can be made. For example, it is possible to provide a thermoplastic resin having a good moldability or to provide a thermoplastic resin having good heat resistance and mechanical strength by appropriately selecting their kinds, copolymerization or the like.

On the other hand, examples of the thermosetting resin include various kinds of epoxy resins of bisphenol type, novolak type, and naphthalene-based, phenolic resins, urea resins, melamine resins, polyester (or unsaturated polyester) resins, polyimide resins, silicone resins, polyurethane resins, and the like. In this case, a mixture of two or more kinds of these materials may be employed.

Among these resins, the epoxy resins, phenolic resins, polyimide resins and silicone resins are preferable from the viewpoint of their special excellence in the moldability, high mechanical strength, and high heat resistance. In these resins, the epoxy resins are especially preferable. These thermosetting resins also have an excellent kneadability with the magnetic powder and homogeneity (uniformity) in kneading.

The unhardened thermosetting resin to be used may be either in a liquid state or in a solid (powdery) state at a room temperature.

The bonded magnet according to this invention described in the above may be manufactured, for example, as in the following. First, the magnetic powder, a binding resin and an additive (antioxidant, lubricant, or the like) as needed are mixed and kneaded (e.g. warm kneading) to form a bonded magnet composite (compound). Then, thus obtained bonded magnet composite is formed into a desired magnet form in a space free from magnetic field by a molding method such as compaction molding (press molding), extrusion molding, or injection molding. When the binding resin used is a thermosetting type, the obtained green compact is hardened by heating or the like after molding.

In these three types of molding methods, the extrusion molding and the injection molding (in particular, the injection molding) have advantages in that the latitude of shape selection is broad and the productivity is high, for example. However, these molding methods require to ensure a sufficiently high fluidity of the compound in the molding machine in order to obtain satisfactory moldability. For this reason, in these methods it is not possible to increase the content of the magnetic powder, namely, it is not possible to make bonded magnets having high density, as compared with the case of the compaction molding method. In this invention, however, it is possible to obtain a high magnetic flux density as will be described later, so that excellent magnetic properties can be obtained even without making the bonded magnet high density. This advantage of the present invention can also be extended even in the case where bonded magnets are manufactured by the extrusion molding method or the injection molding method.

The content of the magnetic powder in the bonded magnet is not particularly limited, and it is normally determined by considering the kind of the molding method to be used and the compatibility of moldability and high magnetic properties. For example, it is preferred that the content is in the range of 75–99.5 wt %, and more preferably in the range of 85–97.5 wt %.

In particular, in the case of a bonded magnet manufactured by the compaction molding method, the content of the magnetic powder should preferably lie in the range of 90–99.5 wt %, and more preferably in the range of 93–98.5 wt %.

Further, in the case of a bonded magnet manufactured by the extrusion molding or the injection molding, the content of the magnetic powder should preferably lie in the range of 75–98 wt %, and more preferably in the range of 85–97 wt %.

The density $\rho$ of the bonded magnet is determined by factors such as the specific gravity of the magnetic powder contained in the bonded magnet and the content of the magnetic powder, and the void ratio (porosity) of the bonded magnet and the like. In the bonded magnets according to this invention, the density $\rho$ is not particularly limited to a specific value, but it is preferable to be in the range of 4.5–6.6 $Mg/m^3$, and more preferably in the range of 5.5–6.4 $Mg/m^3$.

In this invention, since the remanent magnetic flux density and the coercive force of the magnetic powder are high, the bonded magnet formed from the magnetic powder provides excellent magnetic properties (especially, high maximum magnetic energy product $(BH)_{max}$) even when the content of the magnetic powder is relatively low. In this regard, it goes without saying that it is possible to obtain the excellent magnetic properties in the case where the content of the magnetic powder is high.

The shape, dimensions and the like of the bonded magnet manufactured according to this invention are not particularly limited. For example, as to the shape, all shapes such as columnar shape, prism-like shape, cylindrical shape (annular shape), circular shape, plate-like shape, curved plate-like shape, and the like are acceptable. As to the dimensions, all sizes starting from large-sized one to ultraminuaturized one are acceptable. However, as repeatedly described in this specification, the present invention is particularly advantageous when it is used for miniaturized magnets and ultraminiaturized magnets.

Further, in the present invention, it is preferred that the coercive force ($H_{CJ}$) (coercive force at a room temperature) of the bonded magnet is 320 to 1200 kA/m, and 400 to 800 kA/m is more preferable. If the coercive force ($H_{CJ}$) is lower than the lower limit value, demagnetization occurs conspicuously when a reverse magnetic field is applied, and the heat resistance at a high temperature is deteriorated. On the other hand, if the coercive force ($H_{CJ}$) exceeds the above upper limit value, magnetizability is deteriorated. Therefore, by setting the coercive force ($H_{CJ}$) to the above range, in the case where the bonded magnet is subjected to multipolar magnetization, a satisfactory magnetization can be accomplished even when a sufficiently high magnetizing field cannot be secured. Further, it is also possible to obtain a sufficient magnetic flux density, thereby enabling to provide high performance bonded magnets.

Furthermore, in the present invention, it is preferable that the maximum magnetic energy product $(BH)_{max}$ of the bonded magnet is equal to or greater than 40 kJ/$m^3$, more preferably equal to or greater than 50 kJ/$m^3$, and most preferably in the range of 70 to 120 kJ/$m^3$. When the maximum magnetic energy product $(BH)_{max}$ is less than 40 kJ/$m^3$, it is not possible to obtain a sufficient torque when used for motors depending on the types and structures thereof.

As described above, according to the cooling roll of this embodiment of the present invention, since the grooves 54 which function as the gas expelling means are provided on the circumferential surface 53, it is possible to expel the gas which has entered between the circumferential surface 53 and puddle 7. Therefore, the floating of the puddle 7 is prevented, so that the puddle 7 can be sufficiently and reliably in contact with the circumferential surface 53. As a result, dispersion or variation in the cooling rates becomes small, so that all of the obtained melt spun ribbons 8 can have high magnetic properties stably.

Therefore, bonded magnets manufactured from the obtained melt spun ribbons can also have high magnetic properties. Further, high magnetic properties can be obtained without pursing high density when manufacturing the bonded magnets. This means that the obtained bonded magnets can have improved moldability, dimensional accuracy, mechanical strength, corrosion resistance and heat resistance and the like.

Figure 9:
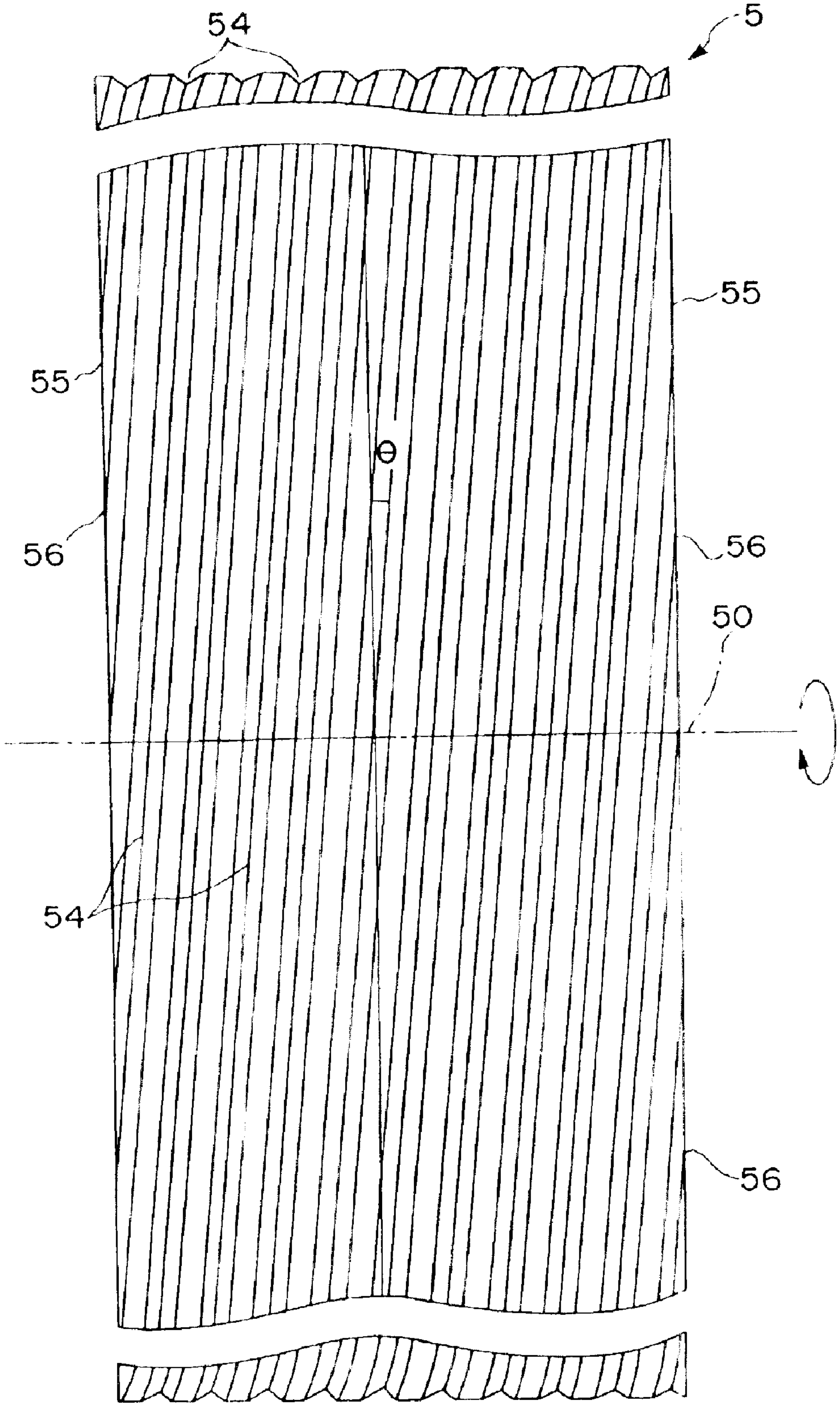
FIG. 9 is a front view which schematically shows a second embodiment of the cooling roll according to the present invention.
Figure 10:
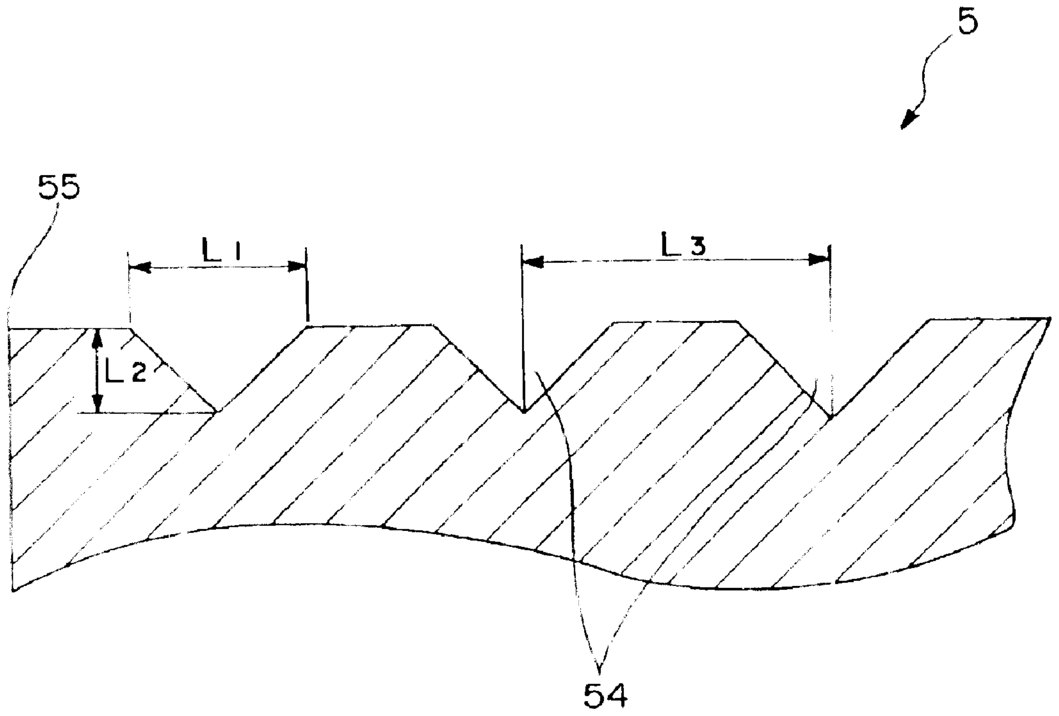
FIG. 10 is a sectional view which schematically shows the structure of a portion in the vicinity of the circumferential surface of the cooling roll shown in FIG. 9.

Next, the second embodiment of the cooling roll 5 according to the present invention will be described. In this regard, FIG. 9 is a front view which schematically shows the second embodiment of the cooling roll 5 according to the present invention, and FIG. 10 is a sectional view which schematically shows the structure of a portion in the vicinity of the circumferential surface of the cooling roll 5 shown in FIG. 9. Hereinbelow, a description will be made with regard to the cooling roll 5 of the second embodiment by focusing on different points between the first and second embodiments, and explanation for the common points is omitted.

As shown in FIG. 9, the grooves 54 are spirally formed with respect to the rotation axis 50 of the cooling roll 5. The grooves 54 having such spiral forms can be formed relatively easily over the entire of the circumferential surface 53. For example, such grooves 54 can be formed by cutting the outer circumferential portion of the cooling roll 5 with a cutting tool such as a lathe which is moved in a constant speed in parallel with the rotation axis 50 of the cooling roll 5 under the state that the cooling roll 5 is being rotated in a constant speed.

In this regard, it is to be understood that the number of the spiral groove may be one or more.

Further, the angle θ (absolute value) defined between the longitudinal direction of the groove 54 and the rotational direction of the cooling roll 5 should preferably be equal to or less than 30°, and more preferably equal to or less than 20°. If the angle θ is equal to or less than 30°, the gas that has entered between the circumferential surface 53 and the puddle 7 can be expelled efficiently regardless of the peripheral velocity of the cooling roll 5.

Further, the angle θ may be changed so as to have the same value or different values depending on locations on the circumferential surface 53. Further, when the two or more grooves 54 are formed, the angle θ may be changed in each of the grooves 54.

In this embodiment, the ends of each groove 54 are formed into openings 56 opened at the opposite edge portions 55 of the circumferential surface 53 in the end surfaces of the cooling roll 5, respectively. This arrangement makes it possible to discharge the gas which has been expelled from between the circumferential surface 53 and the puddle 7 to the lateral sides of the cooling roll 5 through the openings 56, so that it is possible to effectively prevent the discharged gas from reentering between the circumferential surface 53 and the puddle 7 again. Although in the above example the groove 54 has the openings 56 at the opposite ends thereof, such an opening may be provided at one of the ends thereof.

Figure 11:
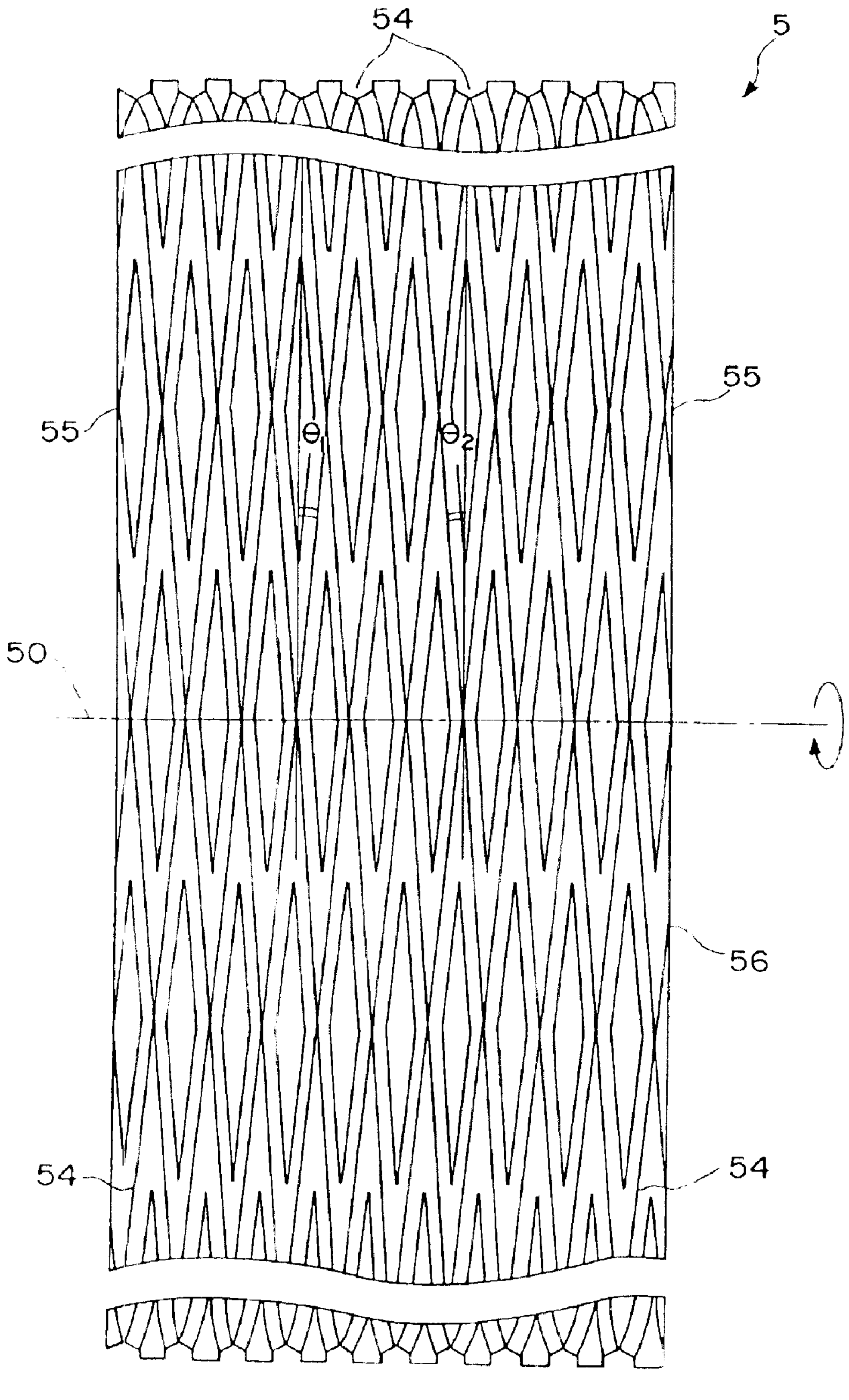
FIG. 11 is a front view which schematically shows a third embodiment of the cooling roll according to the present invention.
Figure 12:
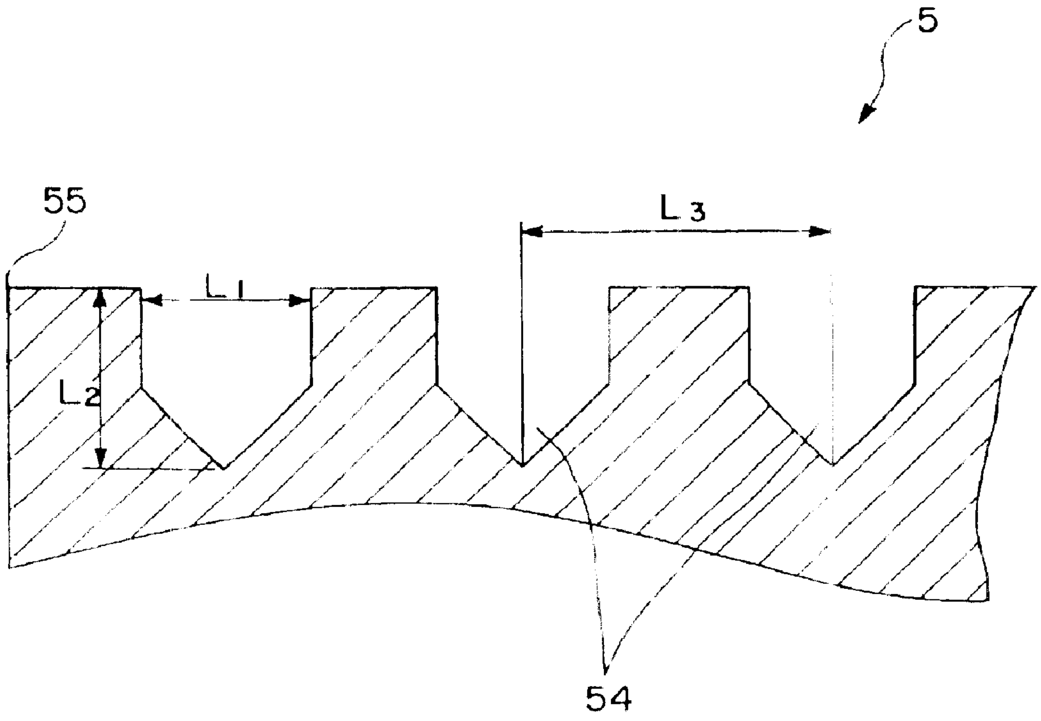
FIG. 12 is a sectional view which schematically shows the structure of a portion in the vicinity of the circumferential surface of the cooling roll shown in FIG. 11.

Next, the third embodiment of the cooling roll 5 according to the present invention will be described. In this regard, FIG. 11 is a front view which schematically shows the third embodiment of the cooling roll 5 according to the present invention, and FIG. 12 is a sectional view which schematically shows the structure of a portion in the vicinity of the circumferential surface of the cooling roll 5 shown in FIG. 11. Hereinbelow, a description will be made with regard to the cooling roll 5 of the third embodiment by focusing on different points between the third embodiment and the first and second embodiments, and explanation for the common points is omitted.

As shown in FIG. 11, in the circumferential surface 53, there are formed at least two spiral grooves 54 of which spiral directions are different from each other so that these grooves 54 intersect to each other at many locations.

In this embodiment, by forming such grooves that are spiraled in the opposite directions, the melt spun ribbon 8 receives laterally exerted force from the dextral spirals as well as laterally exerted force from the sinistral spirals and these forces are cancelled with each other. Therefore, the lateral movement of the melt spun ribbon 8 in FIG. 11 is suppressed so that the advancing direction of the melt spun ribbon 8 becomes stable.

Further, it is preferred that the angles (absolute value) defined between each of the longitudinal directions of the grooves 54 and the rotational direction of the cooling roll 5 (which are represented by $\theta_1$ and $\theta_2$ in FIG. 11) are in the same range as that of the angle θ described above with reference to the second embodiment.

Next, the fourth embodiment of the cooling roll 5 according to the present invention will be described. In this regard, FIG. 13 is a front view which schematically shows the fourth embodiment of the cooling roll 5 according to the present invention, and FIG. 14 is a sectional view which schematically shows the structure of a portion in the vicinity of the circumferential surface of the cooling roll 5 shown in FIG.

13. Hereinbelow, as is the same manner with the second and third embodiments, a description will be made with regard to the cooling roll 5 of the fourth embodiment by focusing on different points between the fourth embodiment and the first, second and third embodiments, and explanation for the common points is omitted.

In this fourth embodiment, the shape or form of the grooves (gas expelling means) is different from those of the first to third embodiments.

Figure 13:
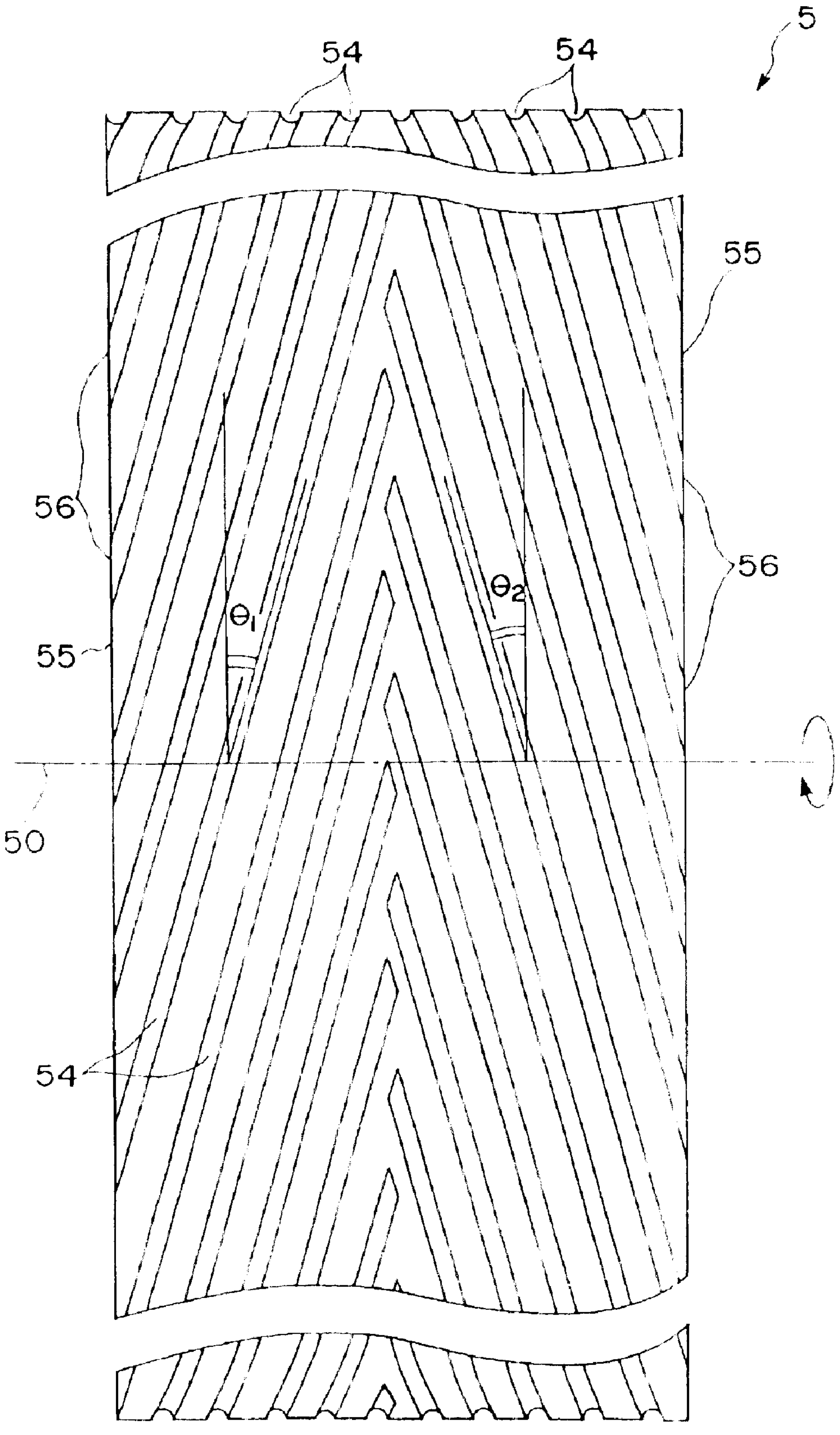
FIG. 13 is a front view which schematically shows a fourth embodiment of the cooling roll according to the present invention.
Figure 14:
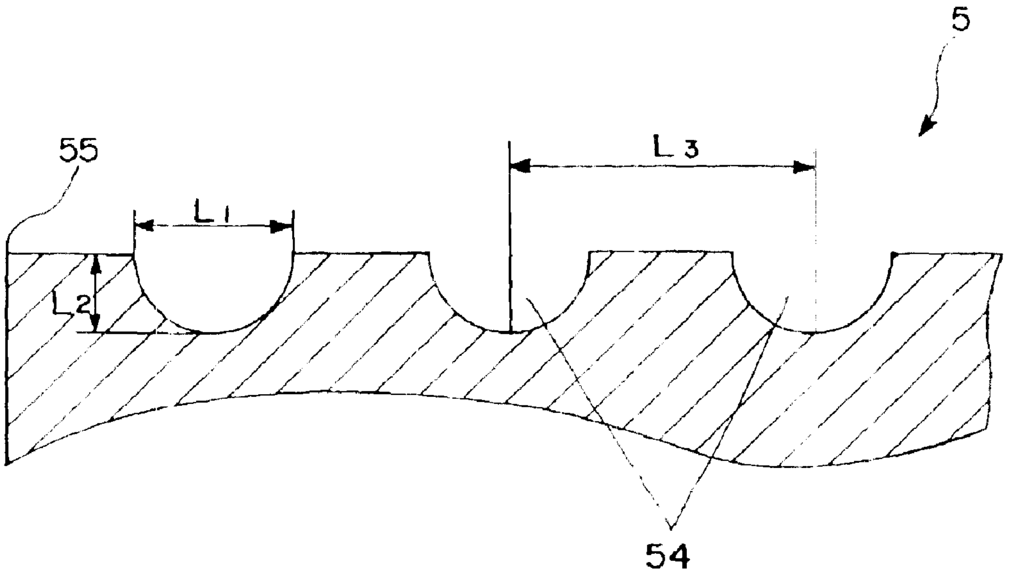
FIG. 14 is a sectional view which schematically shows the structure of a portion in the vicinity of the circumferential surface of the cooling roll shown in FIG. 13.

In this connection, FIG. 13 is a front view which shows the cooling roll used in the fourth embodiment of the manufacturing method of the magnetic material according to the present invention, and FIG. 14 is an enlarged cross-sectional view of the cooling roll shown in FIG. 13.

As shown in FIG. 13, in this embodiment, a plurality of V-shaped grooves each having a peak at the center of the axial direction of the cooling roll 5 and two extending grooves extending to the edges 55 of the circumferential surface 53.

When the cooling roll 5 having these grooves 54 are used, it is possible to expel the gas entered between the circumferential surface 53 and the puddle 7 more effectively by appropriately arranging such grooves with respect to the rotational direction of the cooling roll 5.

Further, when the cooling roll 5 having these grooves 54 are used, the melt spun ribbon 8 receives laterally exerted force from the grooves located at one side thereof as well as laterally exerted force from the grooves located at the other side thereof, and these forces are balanced with each other. As a result, the melt spun ribbon 8 is positioned at the center of the cooling roll 5 in the axial direction thereof so that the advancing direction of the melt spun ribbon 8 is stable.

Although the embodiments of the gas expelling means of the present invention were described above with reference to the first to fourth embodiments, the structure of the gas expelling means such as its shape or form is not limited to those of the embodiments.

Figure 15:
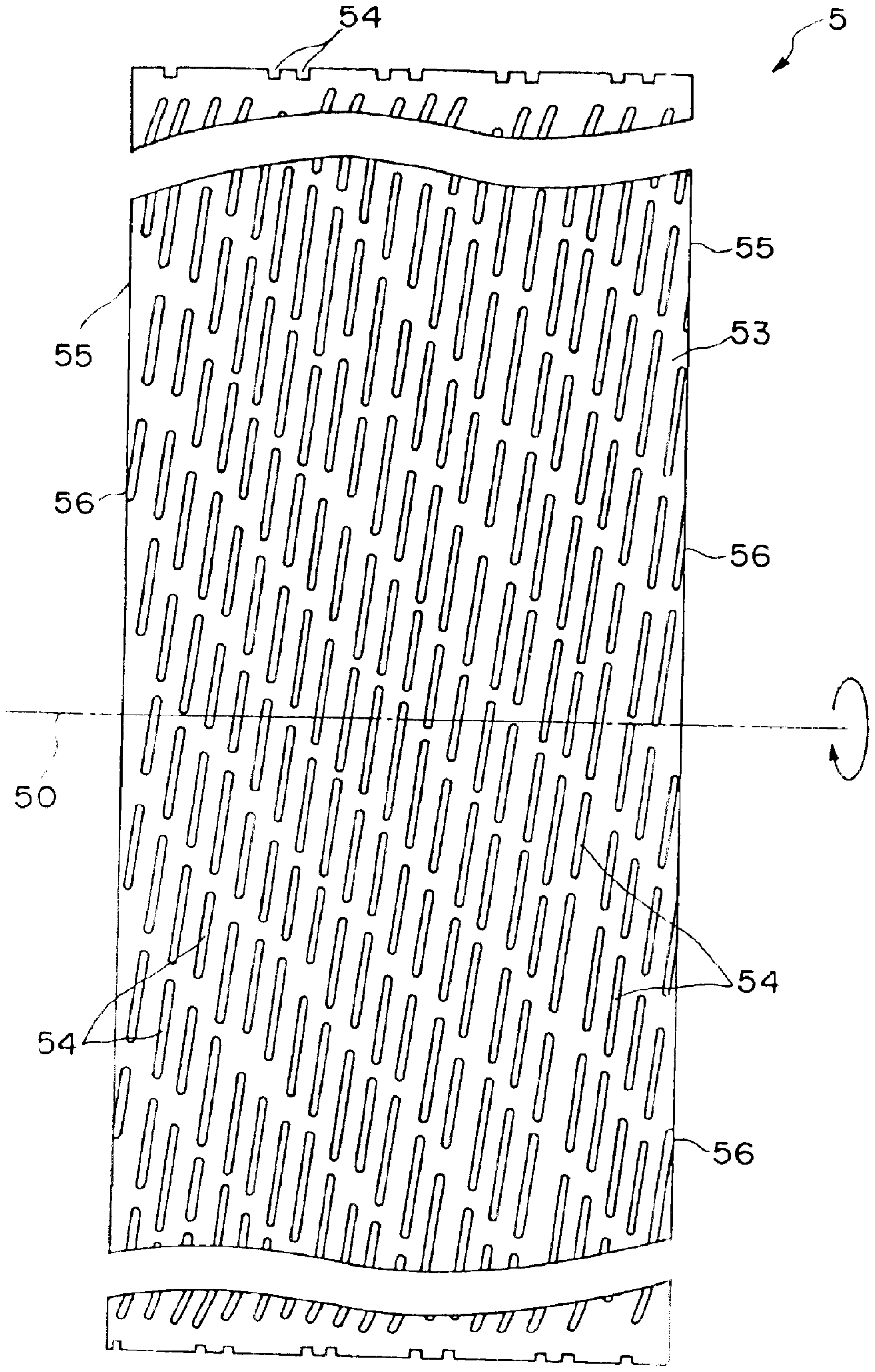
FIG. 15 is a front view which schematically shows other embodiment of the cooling roll according to the present invention.
Figure 16:
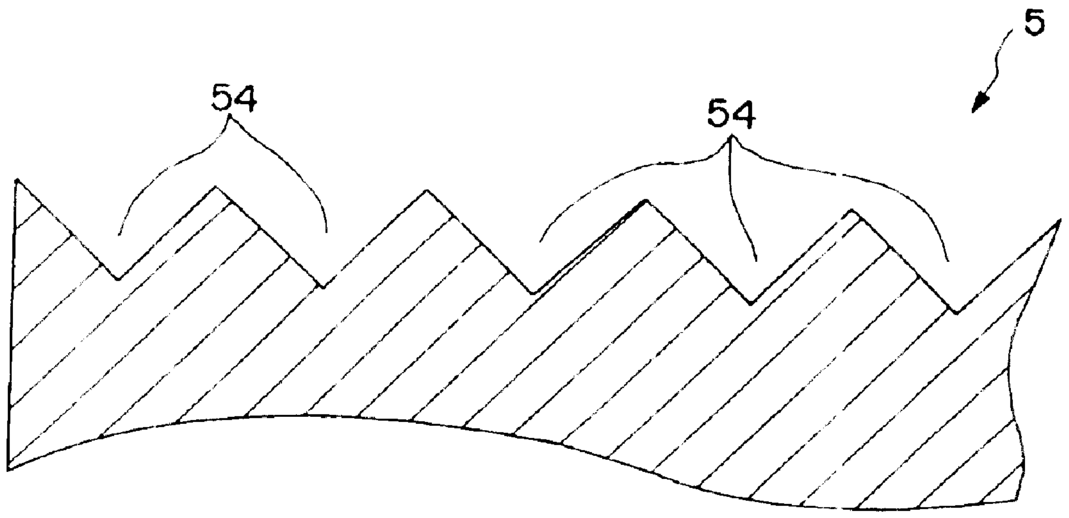
FIG. 16 is a sectional view which schematically shows one example of the cross-sectional shape of the grooves which can be formed in the cooling roll of the present invention.
Figure 17:
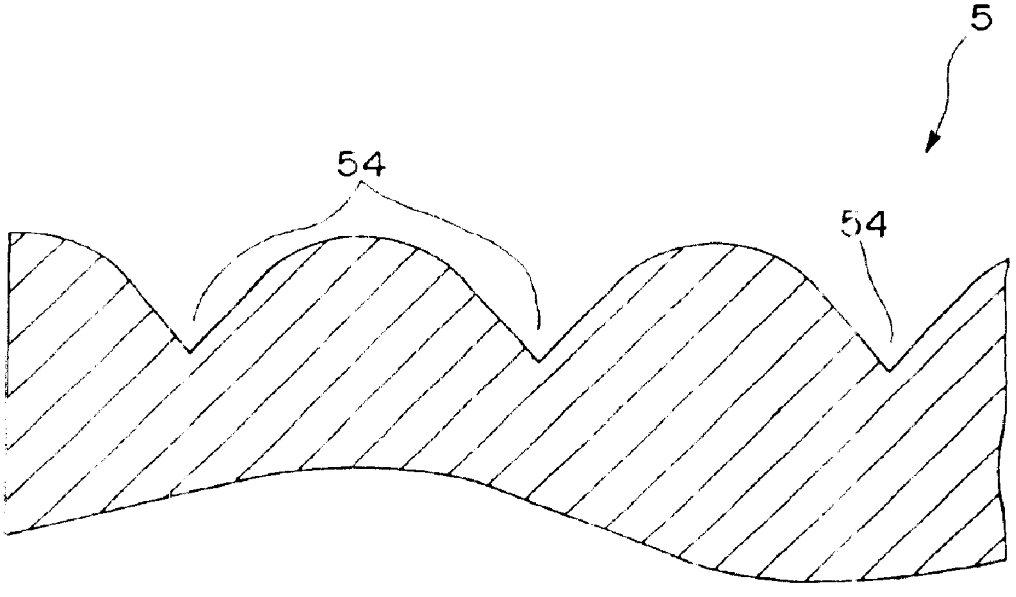
FIG. 17 is a sectional view which schematically shows another example of the cross-sectional shape of the groove which can be formed in the cooling roll of the present invention.

For example, as shown in FIG. 15, the gas expelling means of the present invention can be formed from a number of separate short slanting grooves 54. Further, the cross sectional shape of each groove 54 may be formed into one shown in FIG. 16 or 17.

Figure 18:
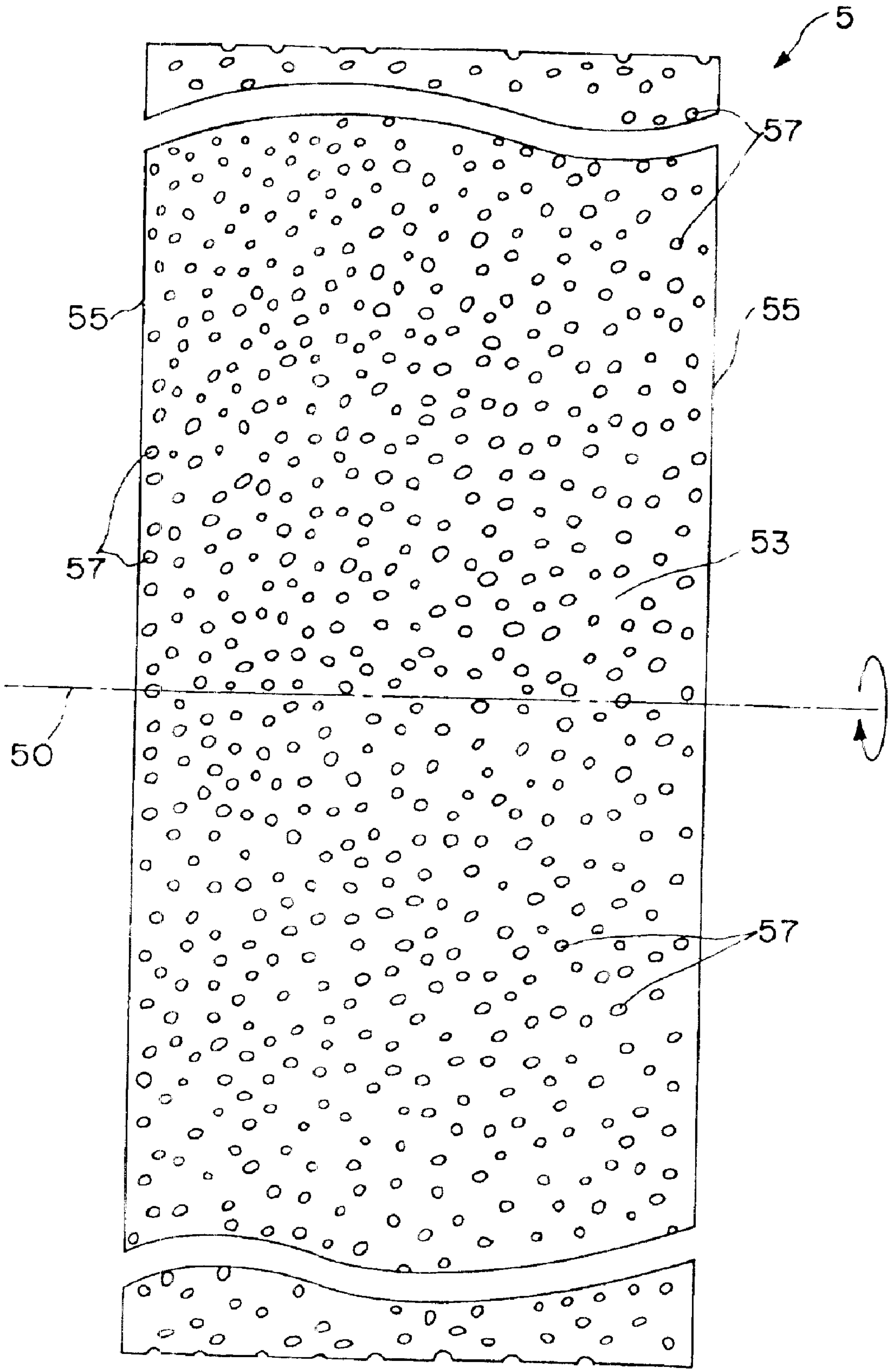
FIG. 18 is a front view which schematically shows yet other embodiment of the cooling roll according to the present invention.
Figure 19:
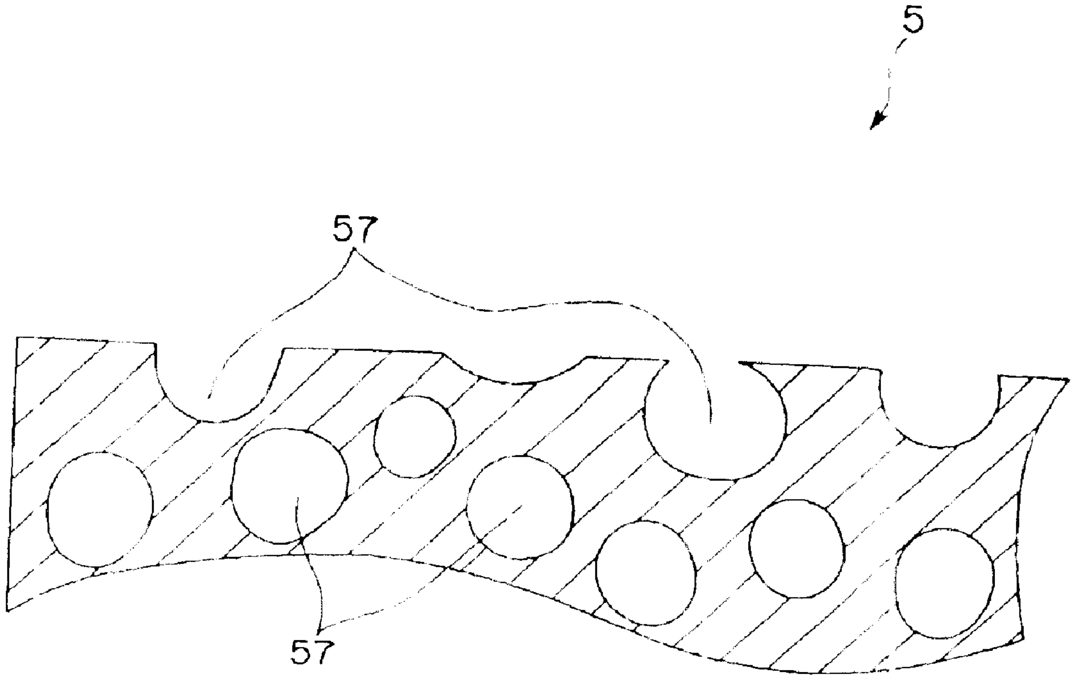
FIG. 19 is a sectional view which schematically shows the structure of a portion in the vicinity of the circumferential surface of the cooling roll shown in FIG. 18.
Figure 20:
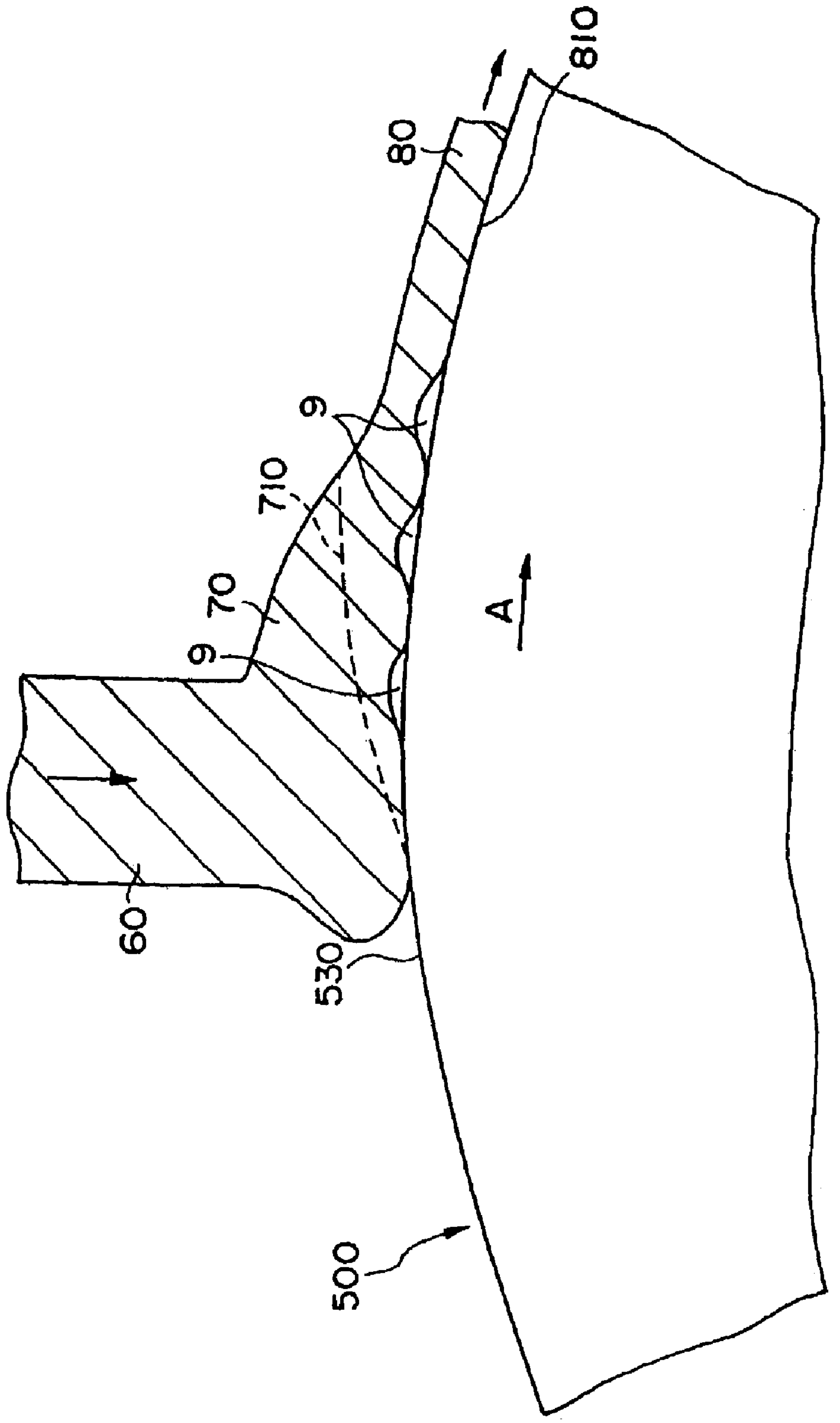
FIG. 20 is a sectional side view which shows the situation caused at or around a colliding section of a molten alloy with a cooling roll in the conventional apparatus (melt spinning apparatus) which manufactures a ribbon-shaped magnetic material using a single roll method.

Furthermore, the gas expelling means of the present invention is not limited to the various grooves described above, and other structure can be adopted if it can function to expel the gas which has entered between the circumferential surface and the puddle. Examples of the other structure include a number of openings or apertures as shown in FIGS. 18 and 19. When the gas expelling means is formed from these openings or apertures, these openings or apertures may be formed into independent forms or continuous forms. However, from the view point of the efficiency of discharge of the gas, it is preferable that they are formed into continuous forms.

According to the cooling rolls 5 shown in FIGS. 15 to 19, it is also possible to obtain the same results as those of the first to fourth embodiments.

EXAMPLES

Hereinafter, actual examples of the present invention will be described.

Example 1

A cooling roll having the gas expelling means shown in FIGS. 1 to 3 was manufactured, and then a melt spinning apparatus equipped with the cooling roll shown in FIG. 1 was prepared.

The cooling roll was manufactured as follows.

First, a roll base (having diameter of 200 mm and width of 30 mm) made of a copper (having heat conductive of 395 $W \cdot m^{-1} \cdot K^{-1}$ at t a temperature of 20° C. and coefficient of thermal expansion of $16.5 \times 10^{-6} K^{-1}$ at a temperature of 20° C.) was prepared, and then it was ground so as to have a mirror finishing outer circumferential surface with a surface roughness of Ra 0.07 $\mu$m.

Then, a plurality of grooves 54 which extend in parallel with the rotational direction of the roll base were formed by cutting.

Next, a surface layer of ZrC (a kind of ceramics) (having heat conductive of 20.6 $W \cdot m^{-1} \cdot K^{-1}$ at a temperature of 20° C. and coefficient of thermal expansion of $7.0 \times 10^{-6} K^{-1}$ at a temperature of 20° C.) was formed onto the outer circumferential surface of the roll base by means of ion plating to obtain the cooling roll shown in FIGS. 1 to 3.

By using the melt spinning apparatus 1 having thus obtained cooling roll 5, melt spun ribbons made of an alloy composition represented by the formula of $(Nd_{0.75}Pr_{0.20}Dy_{0.05})_{9.1}Fe_{bal.}Co_{8.5}B_{5.5}$ were manufactured in accordance with the following method.

First, an amount (basic weight) of each of the materials Nd, Pr, Dy, Fe, Co and B was measured, and then a mother alloy ingot was manufactured by casting these materials.

Next, the mother alloy ingot was put into a crystal tube having a nozzle (circular orifice) 3 at the bottom thereof of the melt spinning apparatus 1. Thereafter, a chamber in which the melt spinning apparatus 1 is installed was vacuumed, and then an inert gas (Helium gas) was introduced to create a desired atmosphere of predetermined temperature and pressure.

Next, the mother alloy ingot in the crystal tube was melt by heating it by means of high frequency inductive heating. Then, under the conditions that the peripheral velocity of the cooling roll 5 was set to be 27 m/sec, the injection pressure (that is, the differential pressure between the ambient pressure and the summed pressure of the internal pressure of the crystal tube and the pressure applied to the surface of the liquid in the tube which is in proportion to the liquid level) of the molten alloy 6 was set to be 40 kPa, and the pressure of the ambient gas was set to be 60 kPa, the molten alloy 6 was injected toward the apex of the cooling roll 5 from just above the rotational axis of the cooling roll 5, to manufacture a melt spun ribbon 8 continuously.

Examples 2 to 7

In addition to the above, another six types of cooling rolls each having the same configuration as that of the cooling roll A excepting that the shape and form of the grooves were formed into those shown in FIGS. 9 and 10 were manufactured. Here, it should be noted that these cooling rolls G were manufactured so that the average width of each groove, the average depth of each groove, the average pitch of the adjacent grooves and the angle θ defined between the longitudinal direction of each groove and the rotational direction the cooling roll were different from with each other in each of the cooling rolls. Further, in each of the cooling rolls, three sets of grooves were formed using a lathe having three cutting tools arranged so as to have the same interval so that the adjacent grooves have the same pitch in all the portions in the circumferential surfaces thereof. Then, by replacing the cooling roll of the melt spinning apparatus used in Example 1 with each of these cooling rolls sequentially, melt spun ribbons were manufactured in the same manner as Example 1.

Example 8

Further, another cooling roll was also manufactured in the same manner as the cooling roll of Example 2 excepting that the shape and form of the grooves were formed into those shown in FIGS. 11 and 12. Then, in the same manner as Example 1, a melt spun ribbon was manufactured by replacing the cooling roll of the melt spinning apparatus with this cooling roll.

Example 9

Furthermore, another cooling roll was also manufactured in the same manner as the cooling roll of Example 1 excepting that the shape and form of the grooves were formed into those shown in FIGS. 13 and 14. Then, under the same conditions, a melt spun ribbon was manufactured by replacing the cooling roll of the melt spinning apparatus with this cooling roll.

Comparative Example

Moreover, another cooling roll was also manufactured in the same manner as the cooling roll of Example 1 excepting that no grooves were formed after the outer circumferential surface was formed into a mirror finishing surface by grinding. Then, in the same manner as Example 1, a melt spun ribbon was manufactured by replacing the cooling roll of the melt spinning apparatus with this cooling roll.

In each of these cooling rolls of the Examples 1 to 9 and Comparative Example, the thickness of each surface layer was 7 $\mu$m. Further, in each of the cooing rolls, no machine work was carried out onto the surface layer after the formation of the surface layers. Further, in each of the cooling rolls, the width of each groove $L_1$ (average value), the depth of each groove $L_2$ (average value), the pitch $L_3$ (average value) of the adjacent grooves, the angle $\theta$ defined between the longitudinal direction of each groove and the rotational direction the cooling roll, the ratio of the projected area of the grooves with respect to the projected area of the circumferential surface of the cooling roll, and the surface roughness Ra of a part of the circumferential surface other than a part of the grooves were measured, and the measured values thereof are shown in the attached TABLE 1.

The following evaluations (1) and (2) were made for each of the melt spun ribbons which were manufactured by Examples 1 to 9 and Comparative Example.

(1) Magnetic Properties of the Respective Melt Spun Ribbons

A strip of the melt spun ribbon having the length of 5 cm was cut out from each of the melt spun ribbons, and then five samples each having the length of about 7 mm were obtained from each strip. Thereafter, for each of the samples, the average thickness t and the magnetic properties thereof were measured.

The thickness was measured using a micrometer at 20 sampling points in each of the samples, and the average of the measured values was used as the average thickness t. With regard to the magnetic properties, the remanent magnetic flux density Br(T), the coercive force $H_{cj}$ (kA/m) and the maximum energy product $(BH)_{max}$ (kJ/m$^3$) were measured using a vibration type sample magnetometer (VSM). In the measurement, the magnetic field was applied along the major axis of the respective melt spun ribbons. However, no demagnetization correction was performed.

(2) Magnetic Properties of Bonded Magnets

Each of the melt spun ribbons was subjected to a heat treatment in the argon gas atmosphere at a temperature of 675° C. for 300 sec.

Each of the melt spun ribbons to which the heat treatment was made was them milled to obtain magnetic powder of the mean particle size (diameter) of 70 $\mu$m.

To analyze the phase structure of the obtained magnetic powders, the respective magnetic powders were subjected to an X-ray diffraction test using Cu—K$\alpha$ line at the diffraction angle (2$\theta$) of 20°–60°. With this result, from the diffraction pattern of the respective magnetic powders, it was confirmed that there are a diffraction peak of a hard magnetic phase of $R_2(Fe.Co)_{14}B$ phase, and a diffraction peak of a soft magnetic phase of $\alpha$-(Fe, Co) phase. Further, from the observation results by the transmission electron microscope (TEM), the respective magnetic powders have a composite structure (nanocomposite structure). Furthermore, in each of the magnetic powders, an average grain size of each of these phases was also measured.

Next, each of the magnetic powders was mixed with an epoxy resin to obtain compositions for bonded magnets (compounds). In this case, each compound had the same mixing ratio (parts by weight) of the magnetic powder and the epoxy resin. Namely, in each sample, about 97.5 wt % of magnetic powder was contained.

Thereafter, each of the thus obtained compounds was milled or crushed to be granular. Then, the granular substance (particle) was weighed and filled into a die of a press machine, and then it was subjected to a compaction molding (in the absence of a magnetic field) at a room temperature and under the pressure of 700 MPa, to obtain a mold body. Then, the mold body was removed from the die, and then it was hardened by heating at a temperature of 175° C. to obtain a bonded magnet of a columnar shape having a diameter of 10 mm and a height of 8 mm.

Next, after pulse magnetization was performed for the respective bonded magnets under the magnetic field strength of 3.2 MA/m, magnetic properties (remanent magnetic flux density Br, coercive force $H_{CJ}$, and maximum magnetic energy product $(BH)_{max}$) were measured using a DC recording fluxmeter (manufactured and sold by Toei Industry Co. Ltd with the product code of TRF-5BH) under the maximum applied magnetic field of 2.0 MA/m. The temperature at the measurement was 23° C. (that is, room temperature).

The results of the measurements were shown in the attached TABLES 2 to 4.

As seen from TABLES 2 and 3, the melt spun ribbons of Examples 1 to 9 have less dispersion in their magnetic properties, and they have generally excellent magnetic properties. This is supposed to be resulted from the following reasons.

Namely, the cooling rolls of Examples 1 to 9 had the gas expelling means on their circumferential surfaces. Therefore, in the manufacturing processes using these cooling rollers, gas which entered between the puddle and the circumferential surface was effectively expelled so that the puddle could be sufficiently and reliably in contact with the circumferential surface, thereby enabling to prevent or suppress formation of huge dimples on the roll contact surface of the melt spun ribbon. Consequently, the difference in the cooling rates at the various portions of the melt spun ribbon can be made small and therefore the obtained melt spun ribbon has small dispersion in its crystal grain sizes, so that dispersion in the magnetic properties also becomes small.

On the other hand, in the melt spun ribbon of Comparative Example, there is large dispersion in its magnetic properties in spite of the fact that it has been cut out from the same melt spun ribbon. This is supposed to be resulted from the following reasons.

In this melt spun ribbon, the gas which has entered between the puddle and the circumferential surface remains as it is to form huge dimples on the roll contact surface of the melt spun ribbon. Therefore, while a portion of the roll contact surface which is in contact with the circumferential surface has a relatively high cooling rate, a portion of the roll contact surface where such dimples are formed has a lower cooling rate so that the crystal grain size at that portion becomes coarse. It is believed that this causes the large dispersion in the magnetic properties of the obtained melt spun ribbon.

Further, as apparent from TABLE 4, the bonded magnets formed from the melt spun ribbons of Examples 1 to 9 have excellent magnetic properties while the bonded magnet formed from Comparative Example has merely poor magnetic properties.

This is supposed to be resulted from the following reasons. Namely, Examples 1 to 9 use the melt spun ribbons which are obtained from the magnetic powders having excellent magnetic properties and less dispersion in their magnetic properties, while Comparative Example uses the melt spun ribbon which is obtained from the magnetic powder having large dispersion in its magnetic properties, so that it is believed that the bonded magnet formed from the melt spun ribbon has poor magnetic properties as a whole.

As described above, according to the present invention, the following effects are realized.

Since the gas expelling means is provided on the circumferential surface of the cooling roll, the puddle can be sufficiently and reliably in contact with the circumferential surface so that high magnetic properties can be obtained stably.

In particular, by appropriately selecting the structural material and thickness of the surface layer and setting the shape and form of the gas expelling means, it is possible to obtain more excellent magnetic properties.

Further, since the magnetic powder is constituted from a composite structure having a soft magnetic phase and a hard magnetic phase, the magnetic powder can have high magnetizability and exhibit excellent magnetic properties, and in particular coercive force and heat resistance are enhanced.

Furthermore, since high magnetic flux density can be obtained, it is possible to manufacture bonded magnets having high magnetic properties even if they are isotropic bonded magnets. In particular, according to the present invention, more excellent magnetic performance can be obtained with a smaller size bonded magnet as compared with the conventional bonded magnet, it is possible to manufacture high performance smaller size motors.

Moreover, since a higher magnetic flux density can be secured as described above, in manufacturing bonded magnets sufficiently high magnetic properties can be obtained without pursuing any means for elevating the density of the bonded magnet. As a result, the dimensional accuracy, mechanical strength, corrosion resistance, heat resistance (heat stability) and the like can be further improved in addition to the improvement in the moldability, so that it is possible to readily manufacture bonded magnets with high reliability.

Moreover, since the magnetizability of the bonded magnet according to this invention is excellent, it is possible to magnetize a magnet with a lower magnetizing field. In particular, multipolar magnetization or the like can be accomplished easily and reliably, and further a high magnetic flux density can be also obtained.

Since a high density is not required to the bonded magnet, the present invention can be adapted to the manufacturing method such as the extrusion molding method or the injection molding method by which molding at high density is difficult as compared with the compaction molding method, and the effects described in the above can also be realized in the bonded magnet manufactured by these molding methods. Accordingly, various molding methods can be selectively used and thereby the degree of selection of shape for the bonded magnet can be expanded.

Finally, it is to be understood that the present invention is not limited to the embodiments and examples described above, and many changes or additions may be made without departing from the scope of the invention which is determined by the following claims.

TABLE 1

Conditions of Circumferential Surface of Cooling Roll and Grooves Formed therein

| | Average Width $L_1$ ($\mu$m) | Average Depth $L_2$ ($\mu$m) | Average Pitch $L_3$ ($\mu$m) | Angle $\theta$ | Projected Area of Portion of Grooves (%) | Surface Roughness Ra ($\mu$m) |
|---|---|---|---|---|---|---|
| Example 1 | 15.0 | 3.2 | 30.0 | 0° | 50 | 0.80 |
| Example 2 | 5.0 | 5.0 | 12.5 | 3° | 40 | 1.12 |
| Example 3 | 9.2 | 1.5 | 10.0 | 5° | 92 | 0.50 |
| Example 4 | 27.0 | 8.0 | 90.0 | 10° | 30 | 2.10 |
| Example 5 | 30.0 | 2.0 | 50.0 | 15° | 60 | 0.55 |
| Example 6 | 15.0 | 1.8 | 20.0 | 20° | 75 | 0.60 |
| Example 7 | 6.4 | 4.0 | 8.0 | 28° | 80 | 0.95 |
| Example 8 | 9.5 | 2.5 | 15.0 | $\theta_1$ = 15°<br>$\theta_2$ = 15° | 58 | 0.63 |
| Example 9 | 20.0 | 1.5 | 30.0 | $\theta_1$ = 10°<br>$\theta_2$ = 20° | 63 | 0.45 |
| Comp. Ex. | — | — | — | — | — | 0.08 |

TABLE 2

Average Thickness of Melt Spun Ribbon and Magnetic Properties thereof (Examples 1–7)

| | Sample No. | Average Thickness ($\mu$m) | $H_{CJ}$ (kA/m) | Br (T) | $(BH)_{max}$ (kJ/m$^3$) |
|---|---|---|---|---|---|
| Example 1 | 1 | 19 | 555 | 1.06 | 160 |
| | 2 | 19 | 550 | 1.05 | 156 |
| | 3 | 18 | 545 | 1.06 | 158 |
| | 4 | 18 | 548 | 1.06 | 160 |
| | 5 | 19 | 552 | 1.05 | 157 |
| Example 2 | 1 | 20 | 560 | 1.04 | 152 |
| | 2 | 19 | 555 | 1.05 | 155 |
| | 3 | 19 | 553 | 1.05 | 153 |
| | 4 | 20 | 561 | 1.05 | 154 |
| | 5 | 19 | 556 | 1.04 | 150 |
| Example 3 | 1 | 22 | 570 | 1.02 | 150 |
| | 2 | 21 | 562 | 1.03 | 149 |
| | 3 | 20 | 558 | 1.02 | 149 |
| | 4 | 22 | 569 | 1.01 | 152 |
| | 5 | 21 | 560 | 1.02 | 151 |

TABLE 2-continued

Average Thickness of Melt Spun Ribbon and Magnetic Properties thereof (Examples 1–7)

| | Sample No. | Average Thickness (μm) | $H_{CJ}$ (kA/m) | Br (T) | $(BH)_{max}$ (kJ/m$^3$) |
|---|---|---|---|---|---|
| Example 4 | 1 | 25 | 554 | 0.96 | 138 |
| | 2 | 19 | 538 | 0.98 | 142 |
| | 3 | 24 | 550 | 0.96 | 140 |
| | 4 | 20 | 542 | 0.97 | 143 |
| | 5 | 21 | 545 | 0.97 | 137 |
| Example 5 | 1 | 20 | 562 | 1.04 | 155 |
| | 2 | 20 | 560 | 1.04 | 152 |
| | 3 | 21 | 564 | 1.03 | 153 |
| | 4 | 20 | 560 | 1.04 | 151 |
| | 5 | 21 | 565 | 1.03 | 150 |
| Example 6 | 1 | 17 | 528 | 1.05 | 159 |
| | 2 | 18 | 535 | 1.05 | 158 |
| | 3 | 18 | 532 | 1.05 | 155 |
| | 4 | 17 | 529 | 1.06 | 157 |
| | 5 | 18 | 533 | 1.05 | 155 |
| Example 7 | 1 | 21 | 559 | 1.03 | 156 |
| | 2 | 22 | 563 | 1.03 | 153 |
| | 3 | 20 | 557 | 1.04 | 154 |
| | 4 | 20 | 556 | 1.04 | 151 |
| | 5 | 20 | 558 | 1.04 | 152 |

TABLE 3

Average Thickness of Melt Spun Ribbon and Magnetic Properties thereof (Examples 8 and 9, Comp. Ex.)

| | Sample No. | Average Thickness (μm) | $H_{CJ}$ (kA/m) | Br (T) | $(BH)_{max}$ (kJ/m$^3$) |
|---|---|---|---|---|---|
| Example 8 | 1 | 19 | 548 | 1.05 | 149 |
| | 2 | 20 | 553 | 1.03 | 150 |
| | 3 | 21 | 545 | 1.04 | 152 |
| | 4 | 19 | 549 | 1.04 | 151 |
| | 5 | 21 | 555 | 1.02 | 154 |
| Example 9 | 1 | 21 | 560 | 1.02 | 149 |
| | 2 | 22 | 562 | 1.01 | 148 |
| | 3 | 20 | 555 | 1.01 | 150 |
| | 4 | 19 | 557 | 1.03 | 148 |
| | 5 | 21 | 563 | 1.02 | 147 |
| Comp. Ex. | 1 | 30 | 413 | 0.72 | 59 |
| | 2 | 18 | 235 | 0.90 | 72 |
| | 3 | 20 | 370 | 0.81 | 75 |
| | 4 | 28 | 330 | 0.78 | 63 |
| | 5 | 17 | 210 | 0.65 | 55 |

TABLE 4

Mean Particle Size of Magnetic Powder and Magnetic Properties of Bonded Magnet

| | Mean Particle Size (nm) | $H_{CJ}$ (kA/m) | Br (T) | $(BH)_{max}$ (kJ/m$^3$) |
|---|---|---|---|---|
| Example 1 | 28 | 550 | 0.88 | 115 |
| Example 2 | 29 | 558 | 0.87 | 110 |
| Example 3 | 35 | 565 | 0.85 | 104 |
| Example 4 | 40 | 545 | 0.81 | 94 |
| Example 5 | 33 | 562 | 0.86 | 107 |
| Example 6 | 27 | 532 | 0.88 | 112 |
| Example 7 | 32 | 559 | 0.87 | 108 |

TABLE 4-continued

Mean Particle Size of Magnetic Powder and Magnetic Properties of Bonded Magnet

| | Mean Particle Size (nm) | $H_{CJ}$ (kA/m) | Br (T) | $(BH)_{max}$ (kJ/m$^3$) |
|---|---|---|---|---|
| Example 8 | 30 | 550 | 0.87 | 106 |
| Example 9 | 34 | 560 | 0.85 | 103 |
| Comp. Ex. | 65 | 355 | 0.68 | 48 |

What is claimed is:

1. A ribbon-shaped magnetic material, which is manufactured by colliding a molten alloy to a circumferential surface of a cooling roll so as to cool and then solidify the molten alloy, comprising:

a roll contact surface; and a free surface, the free surface being opposite the roll contact surface;

wherein the roll contact surface is devoid of dimples; and the cooling roll has gas expelling means defined by at least one spiral-shaped groove with an average width of 0.5–90 μm provided in the circumferential surface of the cooling roll, the gas expelling means for expelling gas entered between the circumferential surface and a puddle of the molten alloy, and preventing the molten alloy from entering the spiral-shaped groove.

2. A magnetic powder which is obtained by milling the ribbon-shaped magnetic material described in claim 1.

3. The magnetic powder as claimed in claim 2, wherein the magnetic powder is subjected to at least one heat treatment during or after a manufacturing process thereof.

4. The magnetic powder as claimed in claim 2, wherein a mean particle size of the powder is 1–300 μm.

5. The magnetic powder as claimed in claim 2, wherein the magnetic powder has a composite structure composed of a hard magnetic phase and a soft magnetic phase.

6. The magnetic powder as claimed in claim 5, wherein an average crystal grain size of each of the hard magnetic phase and the soft magnetic phase is 1–100 nm.

7. A bonded magnet which is manufactured by binding the magnetic powder described in claim 2 with binding resin.

8. The bonded magnet as claimed in claim 7, wherein an intrinsic coercive force ($H_{CJ}$) of the bonded magnet at room temperature is within a range of 320–1220 kA/m.

9. The bonded magnet as claimed in claim 7, wherein a maximum magnetic energy product $(BH)_{max}$ of the bonded magnet is equal to or greater than 40 kJ/m$^3$.

10. A ribbon-shaped magnetic material, which is manufactured by colliding a molten alloy to a circumferential surface of a cooling roll so to cool and then solidify the molten alloy, comprising:

a first surface that is devoid of dimples; and a second surface, the second surface being opposite to the first surface;

wherein the cooling roll has gas expelling means defined by at least one spiral-shaped groove with an average width of 0.5–90 μm provided in the circumferential surface of the cooling roll, the gas expelling means for expelling gas entered between the circumferential surface and a puddle of the molten alloy, and preventing the molten alloy from entering the spiral-shaped groove.

11. The ribbon-shaped magnetic material according to claim 10, wherein the ribbon-shaped magnetic material further comprises a Sm—Fe—N based alloy composition.

12. The ribbon-shaped magnetic material according to claim 11, wherein the Sm—Fe—N based alloy composition is selected from the group consisting of $Sm_2Fe_{17}N_3$ and Sm—Zr—Fe—Co—N based alloys.

* * * * *